US009045685B2

(12) United States Patent
Nair et al.

(10) Patent No.: US 9,045,685 B2
(45) Date of Patent: *Jun. 2, 2015

(54) CAST MOLDED PARTS FORMED FROM A LIQUID CRYSTALLINE POLYMER

(75) Inventors: Kamlesh P. Nair, Florence, KY (US); Steven D. Gray, Mequon, WI (US); Joseph J. Grenci, Florence, KY (US)

(73) Assignee: Ticona LLC, Florence, NY (US)

( * ) Notice: Subject to any disclaimer, the term of this patent is extended or adjusted under 35 U.S.C. 154(b) by 93 days.

This patent is subject to a terminal disclaimer.

(21) Appl. No.: 13/594,923

(22) Filed: Aug. 27, 2012

(65) Prior Publication Data

US 2013/0062558 A1    Mar. 14, 2013

Related U.S. Application Data

(60) Provisional application No. 61/528,383, filed on Aug. 29, 2011, provisional application No. 61/528,398, filed on Aug. 29, 2011, provisional application No. 61/664,811, filed on Jun. 27, 2012, provisional application No. 61/664,850, filed on Jun. 27, 2012, provisional application No. 61/665,010, filed on Jun. 27, 2012.

(51) Int. Cl.
*C09K 19/54* (2006.01)
*C09K 19/30* (2006.01)
(Continued)

(52) U.S. Cl.
CPC ............. *C09K 19/54* (2013.01); *B29C 39/006* (2013.01); *C08L 77/12* (2013.01); *C09K 19/22* (2013.01);
(Continued)

(58) Field of Classification Search
CPC ...... B29C 39/006; B29C 47/38; C09K 19/22; C09K 19/48; C09K 19/54; C09K 19/3086; C09K 19/322; C09K 19/3344; C09K 2019/0481; C09K 19/3809; C08K 5/20; C08K 5/34922

USPC ............... 252/299.5, 299.61, 299.62, 299.63, 252/299.67; 264/299; 524/100, 227
See application file for complete search history.

(56) References Cited

U.S. PATENT DOCUMENTS 4,002,600 A    1/1977 Habermeier
4,038,416 A    7/1977 Mori et al.
(Continued)

FOREIGN PATENT DOCUMENTS

EP    0 055 480    7/1982
EP    0 071 968    2/1983
(Continued)

OTHER PUBLICATIONS

Abstract of European Patent—EP0523326, Jan. 20, 1993, 1 page.
(Continued)

*Primary Examiner* — Shean C Wu
(74) *Attorney, Agent, or Firm* — Dority & Manning, P.A.

(57) ABSTRACT

A molded part having a predetermined shape is provided. The molded part may be formed by casting a liquid crystalline polymer composition into a mold cavity at a relatively low shear rate. Due to the use of a relatively low shear rate, the polymer composition does not generally undergo extensive shear orientation, which can allow the resulting part to be further processed using standard finishing techniques. The ability to use relatively low shear rates during casting is achieved in the present invention through the use of an aromatic amide oligomer. More particularly, the present inventors have discovered that the aromatic amide oligomer can serve as a flow aid by altering intermolecular polymer chain interactions, thereby lowering the overall viscosity of the polymer matrix to "ultralow" levels without having a significant impact on the mechanical properties.

35 Claims, 2 Drawing Sheets

(51) Int. Cl.

| | | |
|---|---|---|
| C09K 19/32 | (2006.01) | |
| C09K 19/34 | (2006.01) | |
| C09K 19/38 | (2006.01) | |
| C08L 77/12 | (2006.01) | |
| B29C 39/00 | (2006.01) | |
| C09K 19/22 | (2006.01) | |
| C09K 19/48 | (2006.01) | |
| C08K 5/20 | (2006.01) | |
| C08K 5/3492 | (2006.01) | |
| C09K 19/04 | (2006.01) | |

(52) U.S. Cl.
CPC ......... *C09K 19/3086* (2013.01); *C09K 19/322* (2013.01); *C09K 19/3444* (2013.01); *C09K 19/48* (2013.01); *C08K 5/20* (2013.01); *C08K 5/34922* (2013.01); *C09K 2019/0481* (2013.01)

(56) References Cited

U.S. PATENT DOCUMENTS

| | | | |
|---|---|---|---|
| 4,083,829 A | 4/1978 | Calundann et al. | |
| 4,132,840 A | 1/1979 | Hugl et al. | |
| 4,161,470 A | 7/1979 | Calundann et al. | |
| 4,163,099 A | 7/1979 | Buxbaum et al. | |
| 4,184,996 A | 1/1980 | Calundann | |
| 4,219,461 A | 8/1980 | Calundann | |
| 4,256,624 A | 3/1981 | Calundann | |
| 4,279,803 A | 7/1981 | Calundann | |
| 4,318,841 A | 3/1982 | East et al. | |
| 4,330,457 A | 5/1982 | East et al. | |
| 4,330,668 A | 5/1982 | Hideo et al. | |
| 4,337,190 A | 6/1982 | Calundann | |
| 4,339,375 A | 7/1982 | Calundann et al. | |
| 4,351,917 A | 9/1982 | Calundann et al. | |
| 4,351,918 A | 9/1982 | Charbonneau et al. | |
| 4,355,132 A | 10/1982 | East et al. | |
| 4,355,134 A | 10/1982 | Charbonneau et al. | |
| 4,375,530 A | 3/1983 | Hay et al. | |
| 4,387,210 A | 6/1983 | Katoh et al. | |
| 4,393,191 A | 7/1983 | East | |
| 4,421,908 A | 12/1983 | East | |
| 4,429,105 A | 1/1984 | Charbonneau | |
| 4,434,262 A | 2/1984 | Buckley et al. | |
| 4,473,682 A | 9/1984 | Calundann et al. | |
| 4,511,709 A | 4/1985 | Yoo et al. | |
| 4,522,974 A | 6/1985 | Calundann et al. | |
| 4,563,508 A | 1/1986 | Cottis et al. | |
| 4,581,399 A | 4/1986 | Yoon | |
| 4,611,025 A | 9/1986 | Akkapeddi et al. | |
| 4,650,836 A | 3/1987 | George et al. | |
| 4,778,858 A | 10/1988 | Ginnings | |
| 4,831,104 A | 5/1989 | Aya et al. | |
| 4,851,562 A | 7/1989 | de Jonge et al. | |
| 4,904,752 A | 2/1990 | Kanoe et al. | |
| 4,952,662 A | 8/1990 | Finke et al. | |
| 4,968,737 A | 11/1990 | Finke et al. | |
| 4,980,444 A | 12/1990 | de Jonge et al. | |
| 4,980,504 A | 12/1990 | de Jonge et al. | |
| 5,093,464 A | 3/1992 | Yoon et al. | |
| 5,102,935 A | 4/1992 | Heinz et al. | |
| 5,120,820 A | 6/1992 | Fujiwara et al. | |
| 5,162,489 A | 11/1992 | de Jonge et al. | |
| 5,171,823 A | 12/1992 | Charbonneau et al. | |
| 5,204,443 A | 4/1993 | Lee et al. | |
| 5,221,730 A | 6/1993 | Morris et al. | |
| 5,237,038 A | 8/1993 | Morris et al. | |
| 5,258,470 A | 11/1993 | Poll et al. | |
| 5,271,865 A | 12/1993 | Hittich et al. | |
| 5,298,593 A | 3/1994 | Fujiwara et al. | |
| 5,324,795 A | 6/1994 | Suenaga | |
| 5,334,343 A | 8/1994 | Po' et al. | |
| 5,352,746 A | 10/1994 | Asai et al. | |
| 5,446,124 A | 8/1995 | Niwano et al. | |
| 5,480,907 A | 1/1996 | Hayashi et al. | |
| 5,496,893 A | 3/1996 | Gagné et al. | |
| 5,500,294 A | 3/1996 | Sakumoto et al. | |
| 5,510,189 A | 4/1996 | Sakumoto et al. | |
| 5,534,187 A | 7/1996 | Miyazawa et al. | |
| 5,541,240 A | 7/1996 | Makhija et al. | |
| 5,541,267 A | 7/1996 | Akkapeddi et al. | |
| 5,563,216 A | 10/1996 | Niwano et al. | |
| 5,573,752 A | 11/1996 | Ranganathan et al. | |
| 5,609,956 A | 3/1997 | Sakumoto et al. | |
| 5,614,316 A | 3/1997 | Hashimoto et al. | |
| 5,616,680 A | 4/1997 | Linstid, III | |
| 5,739,193 A * | 4/1998 | Walpita et al. | 524/413 |
| 5,766,507 A | 6/1998 | Nakai | |
| 5,779,936 A | 7/1998 | Miyazawa et al. | |
| 5,976,406 A | 11/1999 | Nagano et al. | |
| 5,997,765 A | 12/1999 | Furuta et al. | |
| 6,114,492 A | 9/2000 | Linstid, III et al. | |
| 6,294,618 B1 | 9/2001 | Soelch | |
| 6,312,772 B1 | 11/2001 | Kuder et al. | |
| 6,376,076 B1 | 4/2002 | Ohbe et al. | |
| 6,498,274 B1 | 12/2002 | Brown et al. | |
| 6,514,611 B1 | 2/2003 | Shepherd et al. | |
| 6,613,847 B2 | 9/2003 | Soelch | |
| 6,649,730 B2 | 11/2003 | Okamoto et al. | |
| 6,656,386 B2 | 12/2003 | Suenaga et al. | |
| 6,680,002 B2 | 1/2004 | Yamauchi et al. | |
| 6,702,956 B2 | 3/2004 | Maeda et al. | |
| 6,740,728 B2 | 5/2004 | Ding et al. | |
| 6,755,992 B2 | 6/2004 | Okamoto et al. | |
| 7,179,401 B2 | 2/2007 | Ueno et al. | |
| 7,238,714 B2 | 7/2007 | Nakao et al. | |
| 7,335,318 B2 | 2/2008 | Asahara et al. | |
| 7,343,675 B2 | 3/2008 | Smith et al. | |
| 7,344,657 B2 | 3/2008 | Okamoto et al. | |
| 7,393,467 B2 | 7/2008 | Asahara et al. | |
| 7,405,250 B2 | 7/2008 | Kim | |
| 7,507,784 B2 | 3/2009 | Dingemans et al. | |
| 7,534,914 B2 | 5/2009 | Koike et al. | |
| 7,592,413 B2 | 9/2009 | Citron et al. | |
| 7,648,748 B2 | 1/2010 | Nakane et al. | |
| 7,754,717 B2 | 7/2010 | Dimauro et al. | |
| 7,759,344 B2 | 7/2010 | Booker et al. | |
| 7,790,793 B2 | 9/2010 | Schmidt et al. | |
| 7,795,315 B2 | 9/2010 | Chen et al. | |
| 7,803,307 B2 | 9/2010 | Zimmerman | |
| 7,824,572 B2 | 11/2010 | Okamoto | |
| 7,825,176 B2 | 11/2010 | Kim et al. | |
| 8,034,255 B2 | 10/2011 | Goldfinger | |
| 8,084,476 B2 | 12/2011 | Koike et al. | |
| 8,084,637 B2 | 12/2011 | Chopra et al. | |
| 8,142,683 B2 | 3/2012 | Murouchi et al. | |
| 8,309,734 B2 | 11/2012 | Bissantz et al. | |
| 8,669,341 B2 * | 3/2014 | Nair et al. | 528/193 |
| 8,852,730 B2 * | 10/2014 | Nair et al. | 428/220 |
| 2004/0135118 A1 | 7/2004 | Waggoner | |
| 2006/0019110 A1 | 1/2006 | Sato et al. | |
| 2006/0073306 A1 | 4/2006 | Nakane et al. | |
| 2007/0106035 A1 | 5/2007 | Gomurashvili et al. | |
| 2007/0185118 A1 | 8/2007 | Hooft Van Huijsduijnene et al. | |
| 2007/0232594 A1 | 10/2007 | Yokoyama et al. | |
| 2009/0001317 A1 | 1/2009 | Okamoto | |
| 2009/0111950 A1 | 4/2009 | Yamazaki et al. | |
| 2009/0224203 A1 * | 9/2009 | Jung et al. | 252/299.61 |
| 2009/0275697 A1 | 11/2009 | Waggoner et al. | |
| 2009/0308643 A1 * | 12/2009 | Cho et al. | 174/256 |
| 2010/0130743 A1 | 5/2010 | Wada et al. | |
| 2011/0071304 A1 | 3/2011 | Fujimaki et al. | |
| 2011/0184188 A1 | 7/2011 | Wada et al. | |
| 2012/0022202 A1 | 1/2012 | Suh et al. | |
| 2013/0048908 A1 | 2/2013 | Gray et al. | |
| 2013/0048909 A1 | 2/2013 | Nair et al. | |
| 2013/0048910 A1 | 2/2013 | Nair et al. | |
| 2013/0048911 A1 | 2/2013 | Nair et al. | |
| 2013/0052446 A1 | 2/2013 | Nair et al. | |
| 2013/0052447 A1 | 2/2013 | Grenci et al. | |
| 2013/0053531 A1 | 2/2013 | Nair et al. | |

(56) References Cited

U.S. PATENT DOCUMENTS

| | | | |
|---|---|---|---|
| 2013/0053532 | A1 | 2/2013 | Nair et al. |
| 2013/0053533 | A1 | 2/2013 | Nair et al. |
| 2014/0004328 | A1* | 1/2014 | Kim et al. ............... 428/220 |

FOREIGN PATENT DOCUMENTS

| | | |
|---|---|---|
| EP | 0 376 615 | 7/1990 |
| EP | 0 396 955 | 11/1990 |
| EP | 0 413 375 | 2/1991 |
| EP | 0 450 652 | 10/1991 |
| EP | 0 569 980 | 11/1993 |
| EP | 0 852 249 | 7/1998 |
| EP | 1 095 930 | 5/2001 |
| EP | 1 792 942 | 6/2007 |
| GB | 2 158 832 | 11/1985 |
| WO | WO 95/33803 | 12/1995 |
| WO | WO 98/22103 | 5/1998 |
| WO | WO 2004/058851 | 7/2004 |
| WO | WO 2007/038373 | 4/2007 |

OTHER PUBLICATIONS

Abstract of German Patent—DE2041773, 1972, 1 page.
Abstract of German Patent—DE3914048, Mar. 22, 1990, 2 pages.
Abstract of German Patent—DE4017685, Dec. 5, 1991, 1 page.
Abstract of German Patent—DE102005030391, Jan. 26, 2006, 2 pages.
Abstract of Japanese Patent—JP2004182748A, Jul. 2, 2004, 1 page.
Abstract of Japanese Patent—JP2005248052A, Sep. 15, 2005, 1 page.
Abstract of Japanese Patent—JP2005298772A, Oct. 27, 2005, 1 page.
Abstract of Japanese Patent—JP2006225644, Aug. 31, 2006, 1 page.
Abstract of Japanese Patent—JP2006257047, Sep. 28, 2006, 1 page.
Abstract of Japanese Patent—JP2007238851A, Sep. 20, 2007, 1 page.
Abstract of Japanese Patent—JP2009108179A, May 21, 2009, 1 page.
Abstract of Japanese Patent—JP2009108180A, May 21, 2009, 1 page.
Abstract of Japanese Patent—JP2010174114A, Aug. 12, 2010, 1 page.
Abstract of Japanese Patent—JPH01115926, May 9, 1989, 1 page.
Abstract of Japanese Patent—JPH02151626, Jun. 11, 1990, 1 page.
Abstract of Japanese Patent—JPH02240134, Sep. 25, 1990, 1 page.
Abstract of Japanese Patent—JPH02240138, Sep. 25, 1990, 1 page.
Abstract of Japanese Patent—JPH03072559, Mar. 27, 1991, 1 page.
Abstract of Japanese Patent—JPH03095260, Apr. 19, 1991, 2 pages.
Abstract of Japanese Patent—JPH06347770A, Dec. 22, 1994, 2 pages.
Abstract of Japanese Patent—JPH0673239, Mar. 15, 1994, 1 page.
Abstract of Japanese Patent—JPH09143347A, Jun. 3, 1997, 1 page.
Abstract of Japanese Patent—JPH09249813A, Sep. 22, 1997, 2 pages.
Abstract of Japanese Patent—JPH1160927A, Mar. 5, 1999, 2 pages.
Abstract of Japanese Patent—JPS58219233, Dec. 20, 1983, 2 pages.
Abstract of Japanese Patent—JPS5861145, Apr. 12, 1983, 1 page.
Abstract of Japanese Patent—JPS5861146, Apr. 12, 1983, 1 pages.
Abstract of Japanese Patent—JPS5883048, May 18, 1983, 2 pages.
Abstract of Japanese Patent—JPS5893718, Jun. 3, 1983, 2 pages.
Abstract of Japanese Patent—JPS59196364, Nov. 7, 1984, 1 page.
Abstract of Japanese Patent—JPS6049026, Mar. 18, 1984, 2 pages.
Abstract of Japanese Patent—JPS63137950, Jun. 9, 1988, 1 page.
Abstract of Japanese Patent—JPS63280730, Nov. 17, 1988, 2 pages.
Abstract of Japanese Patent—JPS63280731, Nov. 17, 1998, 1 page.
Abstract of Japanese Patent—JPS63280732, Nov. 17, 1988, 2 pages.
Abstract of Polish Patent—PL92807, 1977, 1 page.

Abstract of Taiwanese Patent—TW3978596, Jul. 11, 2000, 1 page.
Abstract of Article—Shaul M. Aharoni, "Hydrogen-Bonded Highly Regular Strictly Alternating Aliphatic-Aromatic Liquid Crystalline Poly(ester amides)," *Macromolecules*, Vo. 21, 1988, pp. 1941-1961.
Abstract of Article and Article—Ishida et al., "Unusual Thermal Behavior of the Aromatic Polyamide Dendrons," *Kobunshi Ronbunshu*, vol. 57, No. 12, Dec. 2000, pp. 825-829.
Abstract of Article—Kajiyama et al., "Synthesis and properties of multiblock copolymers based on polydimethylsiloxane and piperazine-aromatic polyamides," *Journal of Applied Polymer Science*, vol. 39, Issue 8, Apr. 1990, pp. 1699-1708.
Abstract of Article—Preston et al., "Synthesis of high-molecular-weight rodlike polyamides and block copolymers," *Journal of Polymer Science: Polymer Chemistry Edition*, vol. 20, Issue 11, Nov. 1982, pp. 3241-3249.
Abstract of Article—Ueda at al., "Diphenyl (2,3-Dihydro-2-thioxo-3-benzoxazolyl)phosphonate: A New, Reactive Activating Agent for the Synthesis of Amides and Polyamides," *Macromolecules*, vol. 21, No. 1, 1988, pp. 19-24.
Abstract of Article—Ueda et al., "Synthesis of Sequential Polyamide by Direct Polycondensation," *Polymer Journal*, vol. 23, No. 3, 1991, pp. 167-176.
Article—Shaul M. Aharoni, "Monodisperse Rodlike Oligomers and Their Mesomorphic Higher Molecular Weight Homologues," *Macromolecules*, vol. 20, No. 8, 1987, pp. 2010-2017.
Article—Dutta et al., "Polymer Blends Containing Liquid Crystals: A Review," *Polymer Engineering and Science*, Mid-Sep. 1990, vol. 30, No. 17, pp. 1005-1018.
Article—Gale et al., "Conformational Control of Selectivity and Stability in Hybrid Amide/Urea Macrocycles," *Chem. Eur. J.*, vol. 13, 2007, pp. 3320-3329.
Article—Han et al., "A Change in Mechanism from Acidolysis to Phenolysis in the Bulk Copolymerization of 4-Acetoxybenzoic Acid and 6-Acetoxy-2-naphthoic Acid," *Macromolecules*, 1996, vol. 29, No. 26, pp. 8313-8320.
Article—Kuz'min at al., "Kinetics of Acylation of Anilines Monosubstituted in the Ring by Benzoyl Chloride in N,N-Dimethylacetamide," *Zhurnal Organicheskoi Khimii*, vol. 17, No. 11, pp. 2394-2396, 1982.
Article—Li et al., "Modification of rheological properties of a thermotropic liquid crystalline polymer by melt-state reactive processing," *Polymer*, 2012, pp. 1-8.
Article—Oswal et al., "Synthesis and Characterization of Linear Aromatic Polyester-amides from Diacid Chlorides and Aminophenols," *Iranian Polymer Journal*, vol. 13, No. 3, 2004, pp. 205-212.
Article—Quamara et al., "Thermally stimulated depolarization current Investigations of copolyesteramide (Vectra B 950) polymer liquid crystal," *Materials Science—Poland*, vol. 28, No. 3, 2010, pp. 679-691.
Article—Siegmann et al., "Polyblends containing a liquid crystalline polymer," *Polymer*, 1985, vol. 26, August (conference issue), pp. 1325-1330.
Article—Washio et al., "Facile Synthesis of Polyamide Dendrimers from Unprotected $AB_2$ Building Blocks: Dumbbell-Shaped Dendrimer, Star-Shaped Dendrimer, and Dendrimer with a Carboxylic Acid at the Core," *Macromolecules*, vol. 38, No. 6, 2005, pp. 2237-2246.
Paper—Okamoto et al., "Newly Developed LCP film Fabricated by Solvent-Casting Method," *Sumitomo Chemical Co., Ltd.*, Translated from R&D Report, Sumitomo Kagaku, vol. 2005-I, 11 pages.
Paper—Olena Rudko, "Liquid crystalline polymers. Uniaxial-biaxial nematic phase transition," *Term Paper for Physics 498, Emergent States of Matter*, May 6, 2002, pp. 112 (Department of Physics, University of Illinois at Urbana-Champaign).
Search Report and Written Opinion for PCT/US2012/052429 dated Feb. 5, 2013, 11 pages.

* cited by examiner

CAST MOLDED PARTS FORMED FROM A LIQUID CRYSTALLINE POLYMER

RELATED APPLICATIONS

The present application claims priority to U.S. provisional application Ser. Nos. 61/528,383 and 61/528,398, filed on Aug. 29, 2011, and 61/664,811, 61/664,850, and 61/665,010, filed on Jun. 27, 2012, which are incorporated herein in their entirety by reference thereto.

BACKGROUND OF THE INVENTION

Thermotropic liquid crystalline polymers are generally wholly aromatic condensation polymers that have relatively rigid and linear polymer chains so that they melt to form a liquid crystalline phase. A typical process for producing liquid crystalline aromatic polyesters involves mixing one or aromatic diols and dicarboxylic acids and/or hydroxycarboxylic acids with enough of a carboxylic acid anhydride (e.g., acetic anhydride) to acetylate the hydroxyl groups of the diols and/or hydroxycarboxylic acids present. Once formed, the acetylated monomers are thereafter heated to a high temperature to initiate a condensation reaction in which the monomers are converted to a polymer. To favor a reaction equilibrium that optimizes the production of a high molecular weight polymer, byproducts of the condensation reaction (e.g., acetic acid, phenolic derivatives, etc.) are generally removed. The mixture is eventually heated to a relatively high temperature, typically in latter stages under vacuum, to produce the final liquid crystalline polymer. This is done while the process mixture is a liquid (in the melt).

To form parts from such liquid crystalline polymers, "injection molding" techniques are typically employed in which polymer pellets are injected into a heated mold cavity to form a mass that is thereafter cooled and hardened so that it assumes the shape of the cavity. The most common technique for injecting the polymer into the mold cavity involves the extrusion of the polymer through a single- or twin-screw extruder. Unfortunately, however, the high shear rates associated with such extrusion processes can cause the polymer to undergo extensive shear orientation, which leads to a part having anisotropic mechanical properties. This is particularly problematic when attempting to form "stock shapes", such as rods, plates, bars, etc., which typically require further machining that can damage parts of an anisotropic nature.

As such, a need exists for an improved technique of forming parts from liquid crystalline polymers, particularly those that may possess substantially isotropic mechanical properties.

SUMMARY OF THE INVENTION

In accordance with one embodiment of the present invention, a molded part is disclosed that is formed by casting a polymer composition into a mold cavity. The polymer composition comprises a thermotropic liquid crystalline polymer and an aromatic amide oligomer. The polymer composition has a melt viscosity of from about 0.1 to about 80 Pa-s, as determined at a shear rate of 1000 seconds$^{-1}$ and temperature of 350° C. in accordance with ASTM Test No. 1238-70.

In accordance with another embodiment of the present invention, a method for forming a molded part is disclosed. The method comprises casting a polymer composition into a mold cavity, wherein the polymer composition comprises a thermotropic liquid crystalline polymer and an aromatic amide oligomer. The cast polymer composition is allowed to cool within the mold cavity to form the molded part.

Other features and aspects of the present invention are set forth in greater detail below.

BRIEF DESCRIPTION OF THE FIGURES

A full and enabling disclosure of the present invention, including the best mode thereof to one skilled in the art, is set forth more particularly in the remainder of the specification, including reference to the accompanying figures, in which.

DETAILED DESCRIPTION

Definitions

Figure 1:
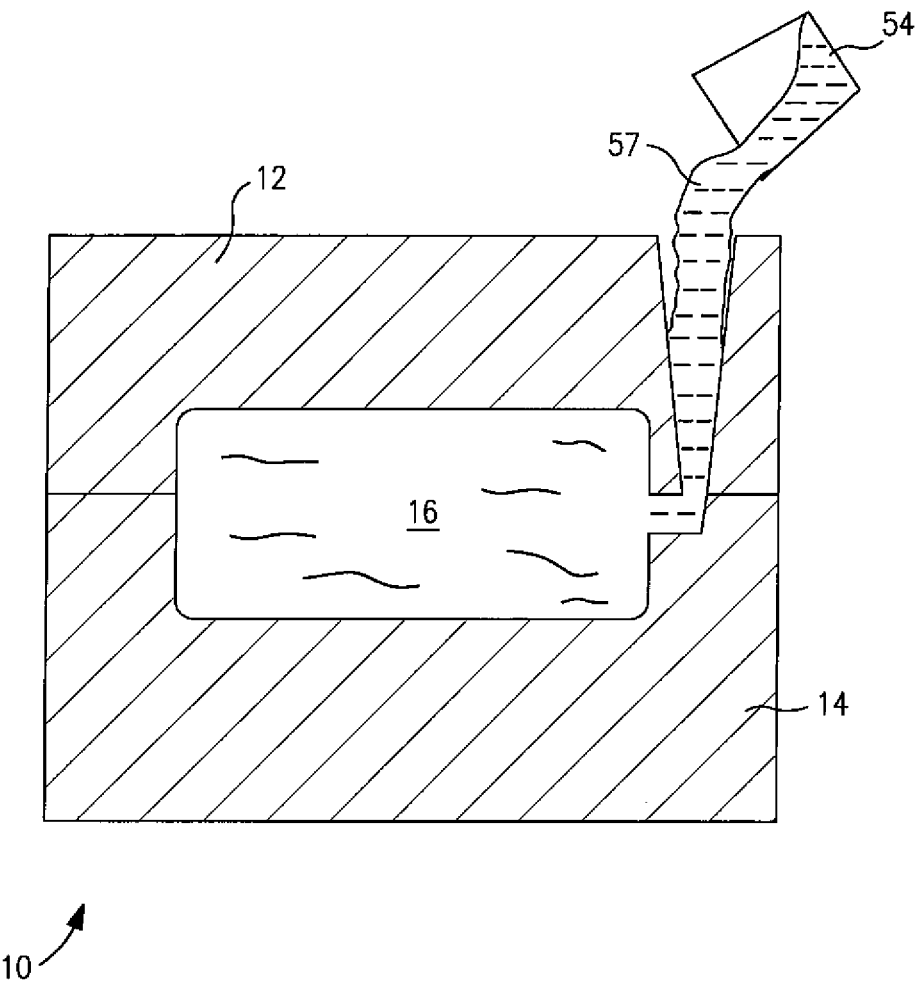
FIG. 1 is a schematic illustration of one embodiment for cast molding a polymer composition into a stock shape.

It is to be understood that the terminology used herein is for the purpose of describing particular embodiments only and is not intended to limit the scope of the present invention.

"Alkyl" refers to monovalent saturated aliphatic hydrocarbyl groups having from 1 to 10 carbon atoms and, in some embodiments, from 1 to 6 carbon atoms. "$C_{x-y}$alkyl" refers to alkyl groups having from x to y carbon atoms. This term includes, by way of example, linear and branched hydrocarbyl groups such as methyl ($CH_3$), ethyl ($CH_3CH_2$), n-propyl ($CH_3CH_2CH_2$), isopropyl (($CH_3)_2CH$), n-butyl ($CH_3CH_2CH_2CH_2$), isobutyl (($CH_3)_2CHCH_2$), sec-butyl (($CH_3)(CH_3CH_2)CH$), t-butyl (($CH_3)_3C$), n-pentyl ($CH_3CH_2CH_2CH_2CH_2$), and neopentyl (($CH_3)_3CCH_2$).

"Alkenyl" refers to a linear or branched hydrocarbyl group having from 2 to 10 carbon atoms and in some embodiments from 2 to 6 carbon atoms or 2 to 4 carbon atoms and having at least 1 site of vinyl unsaturation (>C=C<). For example, ($C_x$-$C_y$)alkenyl refers to alkenyl groups having from x to y carbon atoms and is meant to include for example, ethenyl, propenyl, 1,3-butadienyl, and so forth.

"Alkynyl" refers to refers to a linear or branched monovalent hydrocarbon radical containing at least one triple bond. The term "alkynyl" may also include those hydrocarbyl groups having other types of bonds, such as a double bond and a triple bond.

"Aryl" refers to an aromatic group of from 3 to 14 carbon atoms and no ring heteroatoms and having a single ring (e.g., phenyl) or multiple condensed (fused) rings (e.g., naphthyl or anthryl). For multiple ring systems, including fused, bridged, and spiro ring systems having aromatic and non-aromatic rings that have no ring heteroatoms, the term "Aryl" applies when the point of attachment is at an aromatic carbon atom (e.g., 5,6,7,8 tetrahydronaphthalene-2-yl is an aryl group as its point of attachment is at the 2-position of the aromatic phenyl ring).

"Cycloalkyl" refers to a saturated or partially saturated cyclic group of from 3 to 14 carbon atoms and no ring heteroatoms and having a single ring or multiple rings including fused, bridged, and spiro ring systems. For multiple ring systems having aromatic and non-aromatic rings that have no ring heteroatoms, the term "cycloalkyl" applies when the point of attachment is at a non-aromatic carbon atom (e.g., 5,6,7,8,-tetrahydronaphthalene-5-yl). The term "cycloalkyl" includes cycloalkenyl groups, such as adamantyl, cyclopropyl, cyclobutyl, cyclopentyl, cyclooctyl, and cyclohexenyl. The term "cycloalkenyl" is sometimes employed to refer to a partially saturated cycloalkyl ring having at least one site of >C=C< ring unsaturation.

"Halo" or "halogen" refers to fluoro, chloro, bromo, and iodo.

"Haloalkyl" refers to substitution of alkyl groups with 1 to 5 or in some embodiments 1 to 3 halo groups.

"Heteroaryl" refers to an aromatic group of from 1 to 14 carbon atoms and 1 to 6 heteroatoms selected from oxygen, nitrogen, and sulfur and includes single ring (e.g., imidazolyl) and multiple ring systems (e.g., benzimidazol-2-yl and benzimidazol-6-yl). For multiple ring systems, including fused, bridged, and spiro ring systems having aromatic and non-aromatic rings, the term "heteroaryl" applies if there is at least one ring heteroatom and the point of attachment is at an atom of an aromatic ring (e.g., 1,2,3,4-tetrahydroquinolin-6-yl and 5,6,7,8-tetrahydroquinolin-3-yl). In some embodiments, the nitrogen and/or the sulfur ring atom(s) of the heteroaryl group are optionally oxidized to provide for the N oxide (N→O), sulfinyl, or sulfonyl moieties. Examples of heteroaryl groups include, but are not limited to, pyridyl, furanyl, thienyl, thiazolyl, isothiazolyl, triazolyl, imidazolyl, imidazolinyl, isoxazolyl, pyrrolyl, pyrazolyl, pyridazinyl, pyrimidinyl, purinyl, phthalazyl, naphthylpryidyl, benzofuranyl, tetrahydrobenzofuranyl, isobenzofuranyl, benzothiazolyl, benzoisothiazolyl, benzotriazolyl, indolyl, isoindolyl, indolizinyl, dihydroindolyl, indazolyl, indolinyl, benzoxazolyl, quinolyl, isoquinolyl, quinolizyl, quianazolyl, quinoxalyl, tetrahydroquinolinyl, isoquinolyl, quinazolinonyl, benzimidazolyl, benzisoxazolyl, benzothienyl, benzopyridazinyl, pteridinyl, carbazolyl, carbolinyl, phenanthridinyl, acridinyl, phenanthrolinyl, phenazinyl, phenoxazinyl, phenothiazinyl, and phthalimidyl.

"Heterocyclic" or "heterocycle" or "heterocycloalkyl" or "heterocyclyl" refers to a saturated or partially saturated cyclic group having from 1 to 14 carbon atoms and from 1 to 6 heteroatoms selected from nitrogen, sulfur, or oxygen and includes single ring and multiple ring systems including fused, bridged, and spiro ring systems. For multiple ring systems having aromatic and/or non-aromatic rings, the terms "heterocyclic", "heterocycle", "heterocycloalkyl", or "heterocyclyl" apply when there is at least one ring heteroatom and the point of attachment is at an atom of a non-aromatic ring (e.g., decahydroquinolin-6-yl). In some embodiments, the nitrogen and/or sulfur atoms) of the heterocyclic group are optionally oxidized to provide for the N oxide, sulfinyl, sulfonyl moieties. Examples of heterocyclyl groups include, but are not limited to, azetidinyl, tetrahydropyranyl, piperidinyl, N-methylpiperidin-3-yl, piperazinyl, N-methylpyrrolidin-3-yl, 3-pyrrolidinyl, 2-pyrrolidon-1-yl, morpholinyl, thiomorpholinyl, imidazolidinyl, and pyrrolidinyl.

It should be understood that the aforementioned groups encompass unsubstituted groups, as well as groups substituted with one or more other functional groups as is known in the art. For example, an alkynyl, alkyl, alkenyl, aryl, heteroaryl, cycloalkyl, or heterocyclyl group may be substituted with from 1 to 8, in some embodiments from 1 to 5, in some embodiments from 1 to 3, and in some embodiments, from 1 to 2 substituents selected from alkyl, alkenyl, alkynyl, alkoxy, acyl, acylamino, acyloxy, amino, quaternary amino, amide, imino, amidino, aminocarbonylamino, amidinocarbonylamino, aminothiocarbonyl, aminocarbonylamino, aminothiocarbonylamino, aminocarbonyloxy, aminosulfonyl, aminosulfonyloxy, aminosulfonylamino, aryl, aryloxy, arylthio, azido, carboxyl, carboxyl ester, (carboxyl ester) amino, (carboxyl ester)oxy, cyano, cycloalkyl, cycloalkyloxy, cycloalkylthio, guanidino, halo, haloalkyl, haloalkoxy, hydroxy, hydroxyamino, alkoxyamino, hydrazino, heteroaryl, heteroaryloxy, heteroarylthio, heterocyclyl, heterocyclyloxy, heterocyclylthio, nitro, oxo, thione, phosphate, phosphonate, phosphinate, phosphonamidate, phosphorodiamidate, phosphoramidate monoester, cyclic phosphoramidate, cyclic phosphorodiamidate, phosphoramidate diester, sulfate, sulfonate, sulfonyl, substituted sulfonyl, sulfonyloxy, thioacyl, thiocyanate, thiol, alkylthio, etc., as well as combinations of such substituents.

"Liquid Crystalline Polymer" generally refers to a polymer that can possess a rod-like structure that allows it to exhibit liquid crystalline behavior in its molten state (e.g., thermotropic nematic state). The polymer may contain aromatic units (e.g., aromatic polyesters, aromatic polyesteramides, etc.) so that it is wholly aromatic (e.g., containing only aromatic units) or partially aromatic (e.g., containing aromatic units and other units, such as cycloaliphatic units). The polymer may also be fully crystalline or semi-crystalline in nature.

DESCRIPTION

It is to be understood by one of ordinary skill in the art that the present discussion is a description of exemplary embodiments only, and is not intended as limiting the broader aspects of the present invention. Generally speaking, the present invention is directed to a molded part having a predetermined shape. The molded part may be formed by casting a liquid crystalline polymer composition into a mold cavity at a relatively low shear rate. Due to the use of a relatively low shear rate, the polymer composition does not generally undergo extensive shear orientation, which can allow the resulting part to be further processed using standard finishing techniques, such as grinding, milling, polishing, drilling, threading, cutting, planning, etc. Low shear casting can also inhibit shear-induced molecular alignment, which can translate into a part having generally isotropic mechanical properties. For instance, contrary to conventional injection molding processes, which typically employ shear rates of greater than about 400 $s^{-1}$, for instance about 2000 $s^{-1}$, the polymer composition of the present invention can be cast into a mold cavity at shear rates of less than about 400 $s^{-1}$, in some embodiments less than about 200 $s^{-1}$, in some embodiments from about 1 to about 100 $s^{-1}$, and in some embodiments, from 2 to about 50 $s^{-1}$.

The ability to use relatively low shear rates during casting is achieved in the present invention through the use of an aromatic amide oligomer. More particularly, the present inventors have discovered that the aromatic amide oligomer can serve as a flow aid (e.g., flow modifier) by altering intermolecular polymer chain interactions, thereby lowering the overall viscosity of the polymer matrix to "ultralow" levels without having a significant impact on the mechanical properties. Without intending to be limited by theory, it is believed that the aromatic amide oligomer can alter intermolecular polymer chain interactions without inducing chain scission to any appreciable extent, thereby lowering the overall viscosity of the polymer matrix under shear. As a result of this discovery, the present inventors have found that polymer compositions may be formed with ultralow melt viscosity values, such as in the range of from about 0.1 to about 80 Pa-s, in some embodiments from about 0.5 to about 60 Pa-s, in some embodiments from about 1 to about 40 Pa-s, and in some embodiments, from about 2 to about 25 Pa-s, determined at a shear rate of 1000 seconds$^{-1}$. Melt viscosity may be determined in accordance with ISO Test No. 11443 at a temperature of 350° C. or at a temperature of about 20° C. greater than the melting point of the polymer composition. Among other things, such an ultralow viscosity can allow the composition to more readily flow into the cavity of a mold without requiring an extensive amount of shear.

Various embodiments of the present invention will now be described in more detail.

I. Liquid Crystalline Polymer

Thermotropic liquid crystalline polymers that are employed in the cast part generally have a high degree of crystallinity that enables them to effectively fill the mold at relatively low strain rates. Suitable examples of such thermotropic liquid crystalline polymers may include, for instance, aromatic polyesters, aromatic poly(esteramides), aromatic poly(estercarbonates), aromatic polyamides, etc., and may likewise contain repeating units formed from one or more aromatic hydroxycarboxylic acids, aromatic dicarboxylic acids, aromatic dials, aromatic aminocarboxylic acids, aromatic amines, aromatic diamines, etc., as well as combinations thereof. The precursor monomers used to form such polymers may generally vary as is known in the art. For example, monomer repeating units may be derived from one or more aromatic hydroxycarboxylic acids, aromatic dicarboxylic acids, aromatic dials, aromatic aminocarboxylic acids, aromatic amines, aromatic diamines, etc., as well as combinations thereof.

Aromatic polyesters, for instance, may be obtained by polymerizing (1) two or more aromatic hydroxycarboxylic acids; (2) at least one aromatic hydroxycarboxylic acid, at least one aromatic dicarboxylic acid, and at least one aromatic diol; and/or (3) at least one aromatic dicarboxylic acid and at least one aromatic diol, as well as derivatives of any of the foregoing. Examples of suitable aromatic hydroxycarboxylic acids include, 4-hydroxybenzoic acid; 4-hydroxy-4'-biphenylcarboxylic acid; 2-hydroxy-6-naphthoic acid; 2-hydroxy-5-naphthoic acid; 3-hydroxy-2-naphthoic acid; 2-hydroxy-3-naphthoic acid; 4'-hydroxyphenyl-4-benzoic acid; 3'-hydroxyphenyl-4-benzoic acid; 4'-hydroxyphenyl-3-benzoic acid, etc., as well as alkyl, alkoxy, aryl and halogen substituents thereof. Examples of suitable aromatic dicarboxylic acids include terephthalic acid; isophthalic acid; 2,6-naphthalenedicarboxylic acid; diphenyl ether-4,4'-dicarboxylic acid; 1,6-naphthalenedicarboxylic acid; 2,7-naphthalenedicarboxylic acid; 4,4'-dicarboxybiphenyl; bis(4-carboxyphenyl)ether; bis(4-carboxyphenyl)butane; bis(4-carboxyphenyl)ethane; bis(3-carboxyphenyl)ether; bis(3-carboxyphenyl)ethane, etc., as well as alkyl, alkoxy, aryl and halogen substituents thereof. Examples of suitable aromatic diols include hydroquinone; resorcinol; 2,6-dihydroxynaphthalene; 2,7-dihydroxynaphthalene; 1,6-dihydroxynaphtha-lene; 4,4'-dihydroxybiphenyl; 3,3'-dihydroxybiphenyl; 3,4'-dihydroxybiphenyl; 4,4'-dihydroxybiphenyl ether; bis(4-hydroxyphenyl)ethane, etc., as well as alkyl, alkoxy, aryl and halogen substituents thereof. In one particular embodiment, the aromatic polyester contains monomer repeat units derived from 4-hydroxybenzoic acid and 2,6-hydroxynaphthoic acid. The synthesis aromatic polyesters may be described in more detail in U.S. Pat. Nos. 4,161,470; 4,473,682; 4,522,974; 4,375,530; 4,318,841; 4,256,624; 4,219,461; 4,083,829; 4,184,996; 4,279,803; 4,337,190; 4,355,134; 4,429,105; 4,393,191; 4,421,908; 4,434,262; and 5,541,240.

In one particular embodiment, for example, an aromatic polyester may be formed that contains monomer repeat units derived from 4-hydroxybenzoic acid and terephthalic acid ("TA") and/or isophthalic acid ("IA"). The monomer units derived from 4-hydroxybenzoic acid ("HBA") may constitute from about 40 mol. % to about 95 mol. %, in some embodiments from about 45 mol. % to about 90 mol. %, and in some embodiments, from about 50 mol. % to about 80 mol. % of the polymer, while the monomer units derived from terephthalic acid and/or isophthalic acid may each constitute from about 1 mol. % to about 30 mol. %, in some embodiments from about 2 mol. % to about 25 mol. %, and in some embodiments, from about 3 mol. % to about 20 mol. % of the polymer. Other monomeric units may optionally be employed, such as aromatic diols (e.g., 4,4'-biphenol, hydroquinone, etc.) and/or hydroxycarboxylic acids (e.g., 6-hydroxy-2-naphthoic acid). For example, monomer units derived from hydroquinone ("HQ"), 4,4'-biphenol ("BP"), and/or acetaminophen ("APAP") may each constitute from about 1 mol. % to about 30 mol. %, in some embodiments from about 2 mol. % to about 25 mol. %, and in some embodiments, from about 3 mol. % to about 20 mol. % when employed. If desired, the polymer may also contain monomer units derived from 6-hydroxy-2-naphthoic acid ("HNA") in an amount of from about 1 mol. % to about 30 mol. %, in some embodiments from about 2 mol. % to about 25 mol. %, and in some embodiments, from about 3 mol. % to about 20 mol. % of the polymer.

Liquid crystalline polyesteramides may likewise be obtained by polymerizing (1) at least one aromatic hydroxycarboxylic acid and at least one aromatic aminocarboxylic acid; (2) at least one aromatic hydroxycarboxylic acid, at least one aromatic dicarboxylic acid, and at least one aromatic amine and/or diamine optionally having phenolic hydroxy groups; and (3) at least one aromatic dicarboxylic acid and at least one aromatic amine and/or diamine optionally having phenolic hydroxy groups, as well as derivatives of any of the foregoing. Suitable aromatic amines/aminophenols and diamines may include, for instance, 3-aminophenol; 4-aminophenol; 1,4-phenylenediamine; 1,3-phenylenediamine, etc., as well as alkyl, alkoxy, aryl and halogen substituents thereof. In one particular embodiment, the aromatic polyesteramide may contain monomer units derived from 2,6-hydroxynaphthoic acid, terephthalic acid, and 4-aminophenol. The monomer units derived from 2,6-hydroxynaphthoic acid may constitute from about 35% to about 85% of the polymer on a mole basis (e.g., 60%), the monomer units derived from terephthalic acid may constitute from about 5% to about 50% (e.g., 20%) of the polymer on a mole basis, and the monomer units derived from 4-aminophenol may constitute from about 5% to about 50% (e.g., 20%) of the polymer on a mole basis. Such aromatic polyesters are commercially available from Ticona, LLC under the trade designation VECTRA® B. In another embodiment, the aromatic polyesteramide contains monomer units derived from 2,6-hydroxynaphthoic acid, and 4-hydroxybenzoic acid, and 4-aminophenol, as well as other optional monomers (e.g., 4,4'-dihydroxybiphenyl and/or terephthalic acid). The synthesis and structure of these and other aromatic poly(esteramides) may be described in more detail in U.S. Pat. Nos. 4,339,375; 4,355,132; 4,351,917; 4,330,457; 4,351,918; and 5,204,443.

Regardless of the particular constituents, the liquid crystalline polymer may be prepared by introducing the appropriate monomer(s) (e.g., aromatic hydroxycarboxylic acid, aromatic dicarboxylic acid, aromatic diol, aromatic amine, aromatic diamine, etc.) into a reactor vessel to initiate a polycondensation reaction. The particular conditions and steps employed in such reactions are well known, and may be described in more detail in U.S. Pat. No. 4,161,470 to Calundann; U.S. Pat. No. 5,616,680 to Linstid, III, et al.; U.S. Pat. No. 6,114,492 to Linstid, III, et al.; U.S. Pat. No. 6,514,611 to Shepherd, et al.; and WO 2004/058851 to Waggoner. The vessel employed for the reaction is not especially limited, although it is typically desired to employ one that is commonly used in reactions of high viscosity fluids. Examples of such a reaction vessel may include a stirring tank-type apparatus that has an agitator with a variably-shaped stirring blade, such as an anchor type, multistage type, spiral-ribbon type, screw shaft type, etc., or a modified shape thereof. Further examples of such a reaction vessel may include a mixing apparatus commonly used in resin kneading, such as a kneader, a roll mill, a Banbury mixer, etc.

If desired, the reaction may proceed through the acetylation of the monomers as known in art. Acetylation may occur in a separate reactor vessel, or it may occur in situ within the polymerization reactor vessel. When separate reactor vessels are employed, one or more of the monomers may be introduced to the acetylation reactor and subsequently transferred to the melt polymerization reactor. Likewise, one or more of the monomers may also be directly introduced to the reactor vessel without undergoing pre-acetylation. Acetylation may be accomplished by adding an acetylating agent (e.g., acetic anhydride) to one or more of the monomers. One particularly suitable technique for acetylating monomers may include, for instance, charging precursor monomers (e.g., 4-hydroxybenzoic acid and 2,6-hydroxynaphthoic acid) and acetic anhydride into a reactor and heating the mixture to acetylize a hydroxyl group of the monomers (e.g., forming acetoxy).

Acetylation is generally initiated at temperatures of about 90° C. During the initial stage of the acetylation, reflux may be employed to maintain vapor phase temperature below the point at which acetic acid byproduct and anhydride begin to distill. Temperatures during acetylation typically range from between 90° C. to 150° C., and in some embodiments, from about 110° C. to about 150° C. If reflux is used, the vapor phase temperature typically exceeds the boiling point of acetic acid, but remains low enough to retain residual acetic anhydride. For example, acetic anhydride vaporizes at temperatures of about 140° C. Thus, providing the reactor with a vapor phase reflux at a temperature of from about 110° C. to about 130° C. is particularly desirable. To ensure substantially complete reaction, an excess amount of acetic anhydride may be employed. The amount of excess anhydride will vary depending upon the particular acetylation conditions employed, including the presence or absence of reflux. The use of an excess of from about 1 to about 10 mole percent of acetic anhydride, based on the total moles of reactant hydroxyl groups present is not uncommon. After any optional acetylation is complete, the resulting composition may be melt-polymerized. Although not required, this is typically accomplished by transferring the acetylated monomer(s) to a separator reactor vessel for conducting a polycondensation reaction. If desired, one or more of the precursor monomers used to form the liquid crystalline polymer may be directly introduced to the melt polymerization reactor vessel without undergoing pre-acetylation. Other components may also be included within the reaction mixture to help facilitate polymerization. For instance, a catalyst may be optionally employed, such as metal salt catalysts (e.g., magnesium acetate, tin(I) acetate, tetrabutyl titanate, lead acetate, sodium acetate, potassium acetate, etc.) and organic compound catalysts (e.g., N-methylimidazole). Such catalysts are typically used in amounts of from about 50 to about 500 parts per million based on the total weight of the recurring unit precursors. The catalyst is typically added to the acetylation reactor rather than the polymerization reactor, although this is by no means a requirement.

After melt-polymerization, the resulting polymer may be removed. In some embodiments, the polymer may also be subjected to a subsequent solid-state polymerization method to further increase its molecular weight. For instance, solid-state polymerization may be conducted in the presence of a gas (e.g., air, inert gas, etc.). Suitable inert gases may include, for instance, include nitrogen, helium, argon, neon, krypton, xenon, etc., as well as combinations thereof. The solid-state polymerization reactor vessel can be of virtually any design that will allow the polymer to be maintained at the desired solid-state polymerization temperature for the desired residence time. Examples of such vessels can be those that have a fixed bed, static bed, moving bed, fluidized bed, etc. The temperature at which solid-state polymerization is performed may vary, but is typically within a range of about 200° C. to about 350° C., in some embodiments from about 225° C. to about 325° C., and in some embodiments, from about 250° C. to about 300° C. The polymerization time will of course vary based on the temperature and target molecular weight. In most cases, however, the solid-state polymerization time will be from about 2 to about 12 hours, and in some embodiments, from about 4 to about 10 hours.

Regardless of the particular method employed, the resulting liquid crystalline polymer typically has a high number average molecular weight ($M_n$) of about 2,000 grams per mole or more, in some embodiments from about 4,000 grams per mole or more, and in some embodiments, from about 5,000 to about 30,000 grams per mole. Of course, it is also possible to form polymers having a lower molecular weight, such as less than about 2,000 grams per mole, using the method of the present invention. The intrinsic viscosity of the polymer, which is generally proportional to molecular weight, may also be relatively high. For example, the intrinsic viscosity may be about 4 deciliters per gram ("dL/g") or more, in some embodiments about 5 dL/g or more, in some embodiments from about 6 to about 20 dL/g, and in some embodiments from about 7 to about 15 dL/g. Intrinsic viscosity may be determined in accordance with ISO-1628-5 using a 50/50 (v/v) mixture of pentafluorophenol and hexafluoroisopropanol.

II. Aromatic Amide Oligomer

As indicated above, an aromatic amide oligomer is also employed as a flow modifier in the polymer composition of the present invention. Such an oligomer can serve as a "flow aid" by altering intermolecular polymer chain interactions, thereby lowering the overall viscosity of the polymer matrix under shear. However, the aromatic amide oligomer does not generally react with the polymer backbone of the liquid crystalline polymer to any appreciable extent. Another benefit of the oligomer is that it is not easily volatized or decomposed. This allows the oligomer to be added to the reaction mixture while it is still at relatively high temperatures. Without intending to be limited by theory, it is believed that active hydrogen atoms of the amide functional groups are capable of forming a hydrogen bond with the backbone of liquid crystalline polyesters or polyesteramides. Such hydrogen bonding strengthens the attachment of the oligomer to the liquid crystalline polymer and thus minimizes the likelihood that it becomes volatilized.

The aromatic amide oligomer generally has a relatively low molecular weight so that it can effectively serve as a flow aid for the polymer composition. For example, the oligomer typically has a molecular weight of about 3,000 grams per mole or less, in some embodiments from about 50 to about 2,000 grams per mole, in some embodiments from about 100 to about 1,500 grams per mole, and in some embodiments, from about 200 to about 1,200 grams per mole. In addition to possessing a relatively low molecular weight, the oligomer also generally possesses high amide functionality so it is capable of undergoing a sufficient degree of hydrogen bonding with the liquid crystalline polymer. The degree of amide functionality for a given molecule may be characterized by its "amide equivalent weight", which reflects the amount of a compound that contains one molecule of an amide functional group and may be calculated by dividing the molecular weight of the compound by the number of amide groups in the molecule. For example, the aromatic amide oligomer may contain from 1 to 15, in some embodiments from 2 to 10, and in some embodiments, from 2 to 8 amide functional groups per molecule. The amide equivalent weight may likewise be from about 10 to about 1,000 grams per mole or less, in some embodiments from about 50 to about 500 grams per mole, and in some embodiments, from about 100 to about 300 grams per mole.

As indicated above, it is desirable that the aromatic amide oligomer is also generally unreactive so that it does not form covalent bonds with the liquid crystalline polymer backbone. To help better minimize reactivity, the oligomer typically contains a core formed from one or more aromatic rings (including heteroaromatic). The oligomer may also contain terminal groups formed from one or more aromatic rings. Such an "aromatic" oligomer thus possesses little, if any, reactivity with the base liquid crystalline polymer. For example, one embodiment of such an aromatic amide oligomer is provided below in Formula (I):

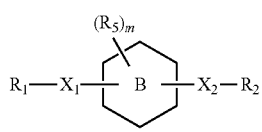

(I)

wherein,
ring B is a 6-membered aromatic ring wherein 1 to 3 ring carbon atoms are optionally replaced by nitrogen or oxygen, wherein each nitrogen is optionally oxidized, and wherein ring B may be optionally fused or linked to a 5- or 6-membered aryl, heteroaryl, cycloalkyl, or heterocyclyl;
$R_5$ is halo, haloalkyl, alkyl, alkenyl, aryl, heteroaryl, cycloalkyl, or heterocyclyl;
m is from 0 to 4;
$X_1$ and $X_2$ are independently C(O)HN or NHC(O); and
$R_1$ and $R_2$ are independently selected from aryl, heteroaryl, cycloalkyl, and heterocyclyl.

In certain embodiments, Ring B may be selected from the following:

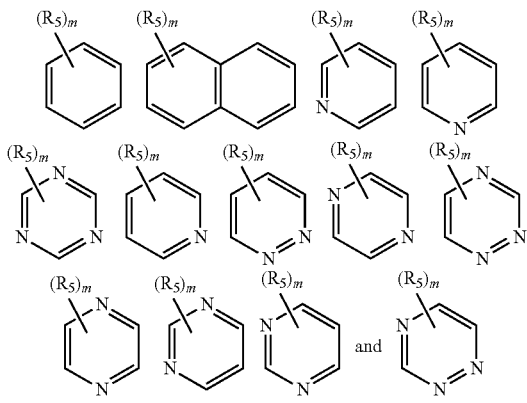

wherein,
m is 0, 1, 2, 3, or 4, in some embodiments m is 0, 1, or 2, in some embodiments m is 0 or 1, and in some embodiments, m is 0; and
$R_5$ is halo, haloalkyl, alkyl, alkenyl, aryl, heteroaryl, cycloalkyl, or heterocyclyl. Ring B may particularly be phenyl.

In certain embodiments, the oligomer is a di-functional compound in that Ring B is directly bonded to only two (2) amide groups (e.g., C(O)HN or NHC(O)). In such embodiments, m in Formula (I) may be 0. Of course, in certain embodiments, Ring B may also be directly bonded to three (3) or more amide groups. For example, one embodiment of such a compound is provided by general formula (II):

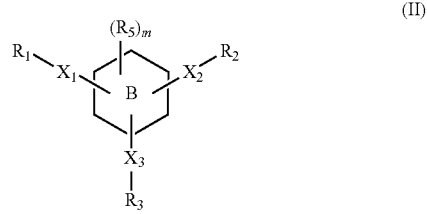

(II)

wherein,
ring B, $R_5$, $X_1$, $X_2$, $R_1$, and $R_2$ are as defined above;
m is from 0 to 3;
$X_3$ is C(O)HN or NHC(O); and
$R_3$ is selected from aryl, heteroaryl, cycloalkyl, and heterocyclyl.

Another embodiment of such a compound is provided by general formula (III):

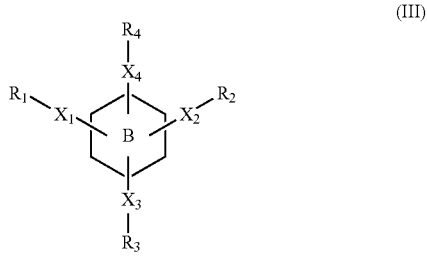

(III)

wherein,
ring B, $R_5$, $X_1$, $X_2$, $X_3$, $R_1$, $R_2$, and $R_3$ are as defined above;
$X_4$ is C(O)HN or NHC(O); and
$R_4$ is selected from aryl, heteroaryl, cycloalkyl, and heterocyclyl.

In some embodiments, $R_1$, $R_2$, $R_3$, and/or $R_4$ in the structures noted above may be selected from the following:

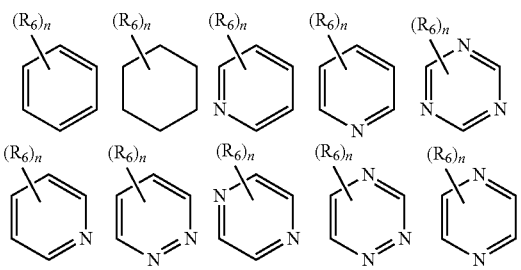

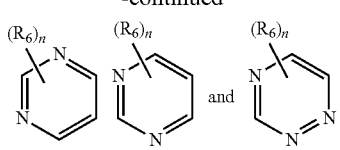

wherein, n is 0, 1, 2, 3, 4, or 5, in some embodiments n is 0, 1, or 2, and in some embodiments, n is 0 or 1; and $R_6$ is halo, haloalkyl, alkyl, alkenyl, aryl, heteroaryl, cycloalkyl, or heterocyclyl.

In one embodiment, the aromatic amide oligomer has the following general formula (IV):

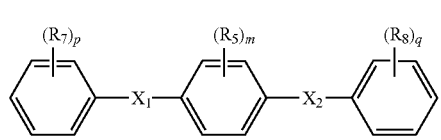

wherein, $X_1$ and $X_2$ are independently C(O)HN or NHC(O);

$R_5$, $R_7$, and $R_8$ are independently selected from halo, haloalkyl, alkyl, alkenyl, aryl, heteroaryl, cycloalkyl, and heterocyclyl;

m is from 0 to 4; and p and q are independently from 0 to 5.

In another embodiment, the aromatic amide oligomer has the following general formula (V):

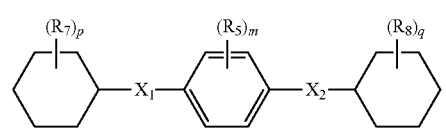

wherein, $X_1$, $X_2$, $R_5$, $R_7$, $R_8$, m, p, and q are as defined above.

For example, in certain embodiments, m, p, and q in Formula (IV) and Formula (V) may be equal to 0 so that the core and terminal groups are unsubstituted. In other embodiments, m may be 0 and p and q may be from 1 to 5. In such embodiments, for example, $R_7$ and/or $R_8$ may be halo (e.g., fluorine). In other embodiments, $R_7$ and/or $R_8$ may be aryl (e.g., phenyl), cycloalkyl (e.g., cyclohexyl), or aryl and/or cycloalkyl substituted with an amide group having the structure: —C(O)$R_{12}$N— or —N$R_{13}$C(O)—, wherein $R_{12}$ and $R_{13}$ are independently selected from hydrogen, alkyl, alkenyl, aryl, heteroaryl, cycloalkyl, and heterocyclyl. In one particular embodiment, for example, $R_7$ and/or $R_8$ are phenyl substituted with —C(O)HN— or —NHC(O)—. In yet other embodiments, $R_7$ and/or $R_8$ may be heteroaryl (e.g., pyridinyl).

In yet another embodiment, the aromatic amide oligomer has the following general formula (VI):

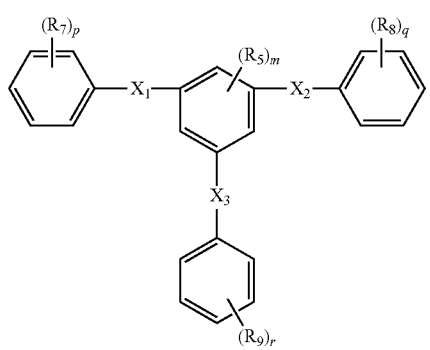

wherein, $X_1$, $X_2$, and $X_3$ are independently C(O)HN or NHC(O);

$R_5$, $R_7$, $R_8$, and $R_9$ are independently selected from halo, haloalkyl, alkyl, alkenyl, aryl, heteroaryl, cycloalkyl, and heterocyclyl;

m is from 0 to 3; and p, q, and r are independently from 0 to 5.

In yet another embodiment, the aromatic amide oligomer has the following general formula (VII):

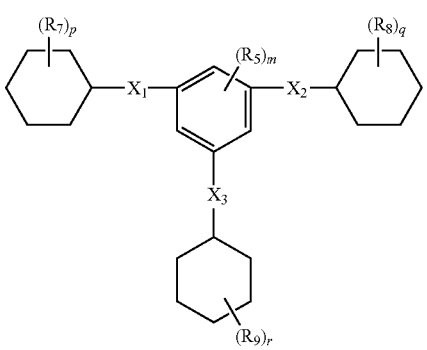

wherein, $X_1$, $X_2$, $X_3$, $R_5$, $R_7$, $R_8$, $R_9$, m, p, q, and r are as defined above.

For example, in certain embodiments, m, p, q, and r in Formula (VI) or in Formula (VII) may be equal to 0 so that the core and terminal aromatic groups are unsubstituted. In other embodiments, m may be 0 and p, q, and r may be from 1 to 5. In such embodiments, for example, $R_7$, $R_8$, and/or $R_9$ may be halo (e.g., fluorine). In other embodiments, $R_7$, $R_8$, and/or $R_9$ may be aryl (e.g., phenyl), cycloalkyl (e.g., cyclohexyl), or aryl and/or cycloalkyl substituted with an amide group having the structure: —C(O)$R_{12}$N— or —N$R_{13}$C(O)—, wherein $R_{12}$ and $R_{13}$ are independently selected from hydrogen, alkyl, alkenyl, aryl, heteroaryl, cycloalkyl, and heterocyclyl. In one particular embodiment, for example, $R_7$, $R_8$, and/or $R_9$ are phenyl substituted with —C(O)HN— or —NHC(O)—. In yet other embodiments, $R_7$, $R_9$, and/or $R_9$ may be heteroaryl (e.g., pyridinyl).

Specific embodiments of the aromatic amide oligomer of the present invention are also set forth in the table below:

| Cmpd # | Structure | Name |
|---|---|---|
| A | | N1,N4-diphenylterephthalamide |
| B | | N1,N4-diphenylisoterephthalamide |
| C | | N1,N4-bis(2,3,4,5,6-pentafluorophenyl)terephthalamide |
| D | | N1,N4-bis(4-benzamidophenyl)terephthalamide |
| E | | N4-phenyl-N1-[4-[[4-(phenylcarbamoyl)benzoyl]amino]phenyl]terephthalamide |
| F1 | | N4-phenyl-N1-[3-[[4-(phenylcarbamoyl)benzoyl]amino]phenyl]terephthalamide |

-continued

| Cmpd # | Structure | Name |
|---|---|---|
| F2 | | N1,N3-bis(4-benzamidophenyl)benzene-1,3-dicarboxamide |
| G1 | | N3-phenyl-N1-[3-[[3-(phenylcarbamoyl)benzoyl]amino]phenyl]benzene-1,3-dicarboxamide |
| G2 | | N1,N3-bis(3-benzamidophenyl)benzene-1,3-dicarboxamide |
| H | | N1,N4-bis(4-pyridyl)terephthalamide |

-continued

| Cmpd # | Structure | Name |
|---|---|---|
| I | | N1,N3-bis(4-phenylphenyl)benzene-1,3-dicarboxamide |
| J | | N1,N3,N5-triphenylbenzene-1,3,5-tricarboxamide |
| K | | N1,N3,N5-tris(4-benzamidophenyl)benzene-1,3,5-tricarboxamide |
| L | | N-(4,6-dibenzamido-1,3,5-triazin-2-yl)benzamide |

| Cmpd # | Structure | Name |
|---|---|---|
| M1 | | N2,N7-dicyclohexylnaphthalene-2,7-dicarboxamide |
| M2 | | N2,N6-dicyclohexylnaphthalene-2,6-dicarboxamide |
| N | | N1,N3,N5-tris(3-benzamidophenyl)benzene-1,3,5-tricarboxamide |
| O1 | | 1,3-Benzenedicarboxamide, N1,N3-dicyclohexyl- |
| O2 | | 1,4-Benzenedicarboxamide, N1,N3-dicyclohexyl- |

The manner in which the aromatic amide oligomer and the liquid crystalline polymer are combined may vary as is known in the art. For instance, because the aromatic amide oligomer does not react with the backbone of the polymer to any appreciable extent, it can be applied during any stage of processing, including during and/or after formation of the liquid crystalline polymer. In one embodiment, for example, the aromatic amide oligomer may be supplied during one or more stages of the polymerization of the liquid crystalline polymer (e.g., acetylation, melt polymerization, solid state polymerization, etc.). For example, the aromatic amide oligomer may be added to the melt polymerization apparatus. Although it may be introduced at any time, it is typically desired to apply the oligomer before melt polymerization has been initiated, and typically in conjunction with the precursor monomers for the liquid crystalline polymer. Of course, in other embodiments, the aromatic amide oligomer may simply be melt blended with the liquid crystalline polymer.

One suitable technique for forming an aromatic polyester may include charging precursor monomers (e.g., 4-hydroxybenzoic acid and 2,6-hydroxynaphthoic acid), aromatic amide oligomer, and an acetylating agent (e.g., acetic anhydride) into a reactor, heating the mixture to a temperature of from about 90° C. to about 150° C. to acetylize a hydroxyl group of the monomers (e.g., forming acetoxy), and then increasing the temperature to a temperature of from about 200° C. to about 450° C. to carry out melt polycondensation. As the final polymerization temperatures are approached, volatile byproducts of the reaction (e.g., acetic acid) may also be removed so that the desired molecular weight may be readily achieved. The reaction mixture is generally subjected to agitation during polymerization to ensure good heat and mass transfer, and in turn, good material homogeneity. The rotational velocity of the agitator may vary during the course of the reaction, but typically ranges from about 10 to about 100 revolutions per minute ("rpm"), and in some embodiments, from about 20 to about 80 rpm. To build molecular weight in the melt, the polymerization reaction may also be conducted under vacuum, the application of which facilitates the removal of volatiles formed during the final stages of polycondensation. The vacuum may be created by the application of a suctional pressure, such as within the range of from about 5 to about 30 pounds per square inch ("psi"), and in some embodiments, from about 10 to about 20 psi. Following melt polymerization, the molten polymer may be discharged from the reactor, typically through an extrusion orifice fitted with a die of desired configuration, cooled, and collected. Commonly, the melt is discharged through a perforated die to form strands that are taken up in a water bath, pelletized and dried.

The relative amount of the aromatic amide oligomer added to the reaction mixture may be selected to help achieve a balance between strength and melt rheology. In most embodiments, for example, the aromatic amide oligomer, or mixtures thereof, may be employed in an amount of from about 0.1 to about 10 parts, in some embodiments from about 0.5 to about 8 parts, and in some embodiments, from about 1 to about 5 parts by weight relative to 100 parts by weight of the reaction mixture. The aromatic amide oligomers may, for example, constitute from about 0.1 wt. % to about 5 wt. %, in some embodiments from about 0.2 wt. % to about 4 wt. %, and in some embodiments, from about 0.3 wt. % to about 1.5 wt. % of the reaction mixture. Liquid crystalline precursor monomers may likewise constitute from about 90 wt. % to about 99.9 wt. %, in some embodiments from about 92 wt. % to about 99.5 wt. %, and in some embodiments, from about 95 wt. % to about 99 wt. % of the reaction mixture.

In addition to or in lieu of being supplied during synthesis, it is also possible to combine the aromatic amide oligomer with a liquid crystalline polymer after it is formed. For instance, the polymer and aromatic amide oligomer may be supplied either simultaneously or in sequence to a melt processing device that dispersively blends the materials. Batch and/or continuous melt processing techniques may be employed. For example, a mixer/kneader, Banbury mixer, Farrel continuous mixer, single-screw extruder, twin-screw extruder, roll mill, etc., may be utilized to blend and melt process the materials. One particularly suitable melt processing device is a co-rotating, twin-screw extruder (e.g., Leistritz co-rotating fully intermeshing twin screw extruder). Such extruders may include feeding and venting ports and provide high intensity distributive and dispersive mixing. For example, the liquid crystalline polymer and oligomer may be fed to the same or different feeding ports of a twin-screw extruder and melt blended to form a substantially homogeneous melted mixture. Melt blending or processing may occur under high shear/pressure and heat to ensure sufficient mixing. For example, melt processing may occur at a temperature of from about 200° C. to about 450° C., in some embodiments from about 220° C. to about 400° C., and in some embodiments, from about 250° C. to about 350° C. Likewise, the apparent shear rate during melt processing may range from about 100 seconds$^{-1}$ to about 10,000 seconds$^{-1}$, and in some embodiments, from about 500 seconds$^{-1}$ to about 1,500 seconds$^{-1}$. Of course, other variables, such as the residence time during melt processing, which is inversely proportional to throughput rate, may also be controlled to achieve the desired degree of homogeneity.

Regardless of the manner in which it is applied, the relative proportion of the liquid crystalline polymer and the aromatic amide oligomer in the composition may be selected to help achieve a balance between viscosity and mechanical properties. More particularly, high oligomer contents can result in low viscosity, but too high of a content may reduce the viscosity to such an extent that the oligomer adversely impacts the melt strength of the polymer. In most embodiments, for example, the aromatic amide oligomer, or mixtures thereof, may be employed in an amount of from about 0.1 to about 10 parts, in some embodiments from about 0.2 to about 8 parts, in some embodiments from about 0.3 to about 5 parts, and in some embodiments, from about 0.4 to about 3 parts by weight relative to 100 parts by weight of the liquid crystalline polymer. The aromatic amide oligomers may, for example, constitute from about 0.1 wt. % to about 10 wt. %, in some embodiments from about 0.2 wt. % to about 8 wt. %, in some embodiments from about 0.3 wt. % to about 5 wt. %, and in some embodiments, from about 0.4 wt. % to about 3 wt. % of the polymer composition.

The melting point of the polymer composition typically ranges from about 250° C. to about 400° C., in some embodiments from about 270° C. to about 380° C., and in some embodiments, from about 300° C. to about 360° C. Likewise, the crystallization temperature may range from about 200° C. to about 400° C., in some embodiments from about 250° C. to about 350° C., and in some embodiments from about 280° C. to about 320° C. The melting and crystallization temperatures may be determined as is well known in the art using differential scanning calorimetry ("DSC"), such as determined by ISO Test No. 11357.

III. Other Additives

In addition to the components identified above, various other additives may also be incorporated in the polymer composition if desired. For example, a filler material may be incorporated into the polymer composition to enhance strength. For example, fibers may be employed as a filler material to improve the mechanical properties. Such fibers generally have a high degree of tensile strength relative to their mass. For example, the ultimate tensile strength of the fibers (determined in accordance with ASTM D2101) is typically from about 1,000 to about 15,000 Megapascals ("MPa"), in some embodiments from about 2,000 MPa to about 10,000 MPa, and in some embodiments, from about 3,000 MPa to about 6,000 MPa. To help maintain an insulative property, which is often desirable for use in electronic components, the high strength fibers may be formed from materials that are also generally insulative in nature, such as glass, ceramics (e.g., alumina or silica), aramids (e.g., Kevlar® marketed by E. I. du Pont de Nemours, Wilmington, Del.), polyolefins, polyesters, etc., as well as mixtures thereof. Glass fibers are particularly suitable, such as E-glass, A-glass, C-glass, D-glass, AR-glass, R-glass, S1-glass, S2-glass, etc., and mixtures thereof.

The volume average length of the fibers may be from about 50 to about 400 micrometers, in some embodiments from about 80 to about 250 micrometers, in some embodiments from about 100 to about 200 micrometers, and in some embodiments, from about 110 to about 180 micrometers. The fibers may also have a narrow length distribution. That is, at least about 70% by volume of the fibers, in some embodiments at least about 80% by volume of the fibers, and in some embodiments, at least about 90% by volume of the fibers have a length within the range of from about 50 to about 400 micrometers, in some embodiments from about 80 to about 250 micrometers, in some embodiments from about 100 to about 200 micrometers, and in some embodiments, from about 110 to about 180 micrometers. The fibers may also have a relatively high aspect ratio (average length divided by nominal diameter) to help improve the mechanical properties of the resulting polymer composition. For example, the fibers may have an aspect ratio of from about 2 to about 50, in some embodiments from about 4 to about 40, and in some embodiments, from about 5 to about 20 are particularly beneficial. The fibers may, for example, have a nominal diameter of about 10 to about 35 micrometers, and in some embodiments, from about 15 to about 30 micrometers.

The relative amount of the fibers in the polymer composition may also be selectively controlled to help achieve the desired mechanical properties without adversely impacting other properties of the composition, such as its flowability. For example, the fibers may constitute from about 2 wt. % to about 40 wt. %, in some embodiments from about 5 wt % to about 35 wt. %, and in some embodiments, from about 6 wt. % to about 30 wt. % of the polymer composition. Although the fibers may be employed within the ranges noted above, small fiber contents may be employed while still achieving the desired mechanical properties. For example, the fibers can be employed in small amounts such as from about 2 wt. % to about 20 wt. %, in some embodiments from about 5 wt. % to about 16 wt. %, and in some embodiments, from about 6 wt. % to about 12 wt. %.

Still other additives that can be included in the composition may include, for instance, antimicrobials, fillers, pigments, antioxidants, stabilizers, surfactants, waxes, solid solvents, and other materials added to enhance properties and processability. For example, mineral fillers may be employed in the polymer composition to help achieve the desired mechanical properties and/or appearance. When employed, such mineral fillers typically constitute from about 1 wt. % to about 40 wt. %, in some embodiments from about 2 wt. % to about 35 wt. %, and in some embodiments, from about 5 wt. % to about 30 wt. % of the polymer composition. Clay minerals may be particularly suitable for use in the present invention. Examples of such clay minerals include, for instance, talc ($Mg_3Si_4O_{10}(OH)_2$), halloysite ($Al_2Si_2O_5(OH)_4$), kaolinite ($Al_2Si_2O_5(OH)_4$), illite (($K,H_3O)(Al,Mg,Fe)_2$ $(Si,Al)_4O_{10}$ $[(OH)_2,(H_2O)]$), montmorillonite ($(Na,Ca)_{0.33}$ $(Al,Mg)_2Si_4O_{10}(OH)_2 \cdot nH_2O$), vermiculite (($MgFe,Al)_3(Al,Si)_4O_{10}(OH)_2 \cdot 4H_2O$), palygorskite (($Mg,Al)_2Si_4O_{10}(OH) \cdot 4(H_2O)$), pyrophyllite ($Al_2Si_4O_{10}(OH)_2$), etc., as well as combinations thereof. In lieu of, or in addition to, clay minerals, still other mineral fillers may also be employed. For example, other suitable silicate fillers may also be employed, such as calcium silicate, aluminum silicate, mica, diatomaceous earth, wollastonite, and so forth. Mica, for instance, may be particularly suitable. There are several chemically distinct mica species with considerable variance in geologic occurrence, but all have essentially the same crystal structure. As used herein, the term "mica" is meant to generically include any of these species, such as muscovite ($KAl_2(AlSi_3)O_{10}$ $(OH)_2$), biotite ($K(Mg,Fe)_3(AlSi_3)O_{10}(OH)_2$), phlogopite ($KMg_3(AlSi_3)O_{10}(OH)_2$), lepidolite ($K(Li,Al)_{2-3}(AlSi_3)O_{10}$ $(OH)_2$), glauconite ($(K,Na)(Al,Mg,Fe)_2(Si,Al)_4O_{10}(OH)_2$), etc., as well as combinations thereof.

Lubricants may also be employed in the polymer composition that are capable of withstanding the processing conditions of the liquid crystalline polymer without substantial decomposition. Examples of such lubricants include fatty acids esters, the salts thereof, esters, fatty acid amides, organic phosphate esters, and hydrocarbon waxes of the type commonly used as lubricants in the processing of engineering plastic materials, including mixtures thereof. Suitable fatty acids typically have a backbone carbon chain of from about 12 to about 60 carbon atoms, such as myristic acid, palmitic acid, stearic acid, arachic acid, montanic acid, octadecinic acid, parinric acid, and so forth. Suitable esters include fatty acid esters, fatty alcohol esters, wax esters, glycerol esters, glycol esters and complex esters. Fatty acid amides include fatty primary amides, fatty secondary amides, methylene and ethylene bisamides and alkanolamides such as, for example, palmitic acid amide, stearic acid amide, oleic acid amide, N,N'-ethylenebisstearamide and so forth. Also suitable are the metal salts of fatty acids such as calcium stearate, zinc stearate, magnesium stearate, and so forth; hydrocarbon waxes, including paraffin waxes, polyolefin and oxidized polyolefin waxes, and microcrystalline waxes. Particularly suitable lubricants are acids, salts, or amides of stearic acid, such as pentaerythritol tetrastearate, calcium stearate, or N,N'-ethylenebisstearamide. When employed, the lubricant(s) typically constitute from about 0.05 wt. % to about 1.5 wt. %, and in some embodiments, from about 0.1 wt. % to about 0.5 wt. % (by weight) of the polymer composition.

IV. Cast Molding

Once formed, the resulting polymer composition may be cast molded into a part having a predetermined shape using techniques as is known in the art. For example, the parts may be cast molded by heating the polymer composition so that it is flowable and thereafter cast into to a molding cavity and cooled. Referring to FIG. 1, for example, one embodiment of a cast molding apparatus or tool 10 that may be employed in the present invention is shown. In this embodiment, the apparatus 10 includes a first mold base 12 and a second mold base 14, which together define an article or component-defining mold cavity 16. The molding apparatus 10 also includes a resin flow path that extends to the mold cavity 16. The temperature of the mold ("molding temperature") is typically at a level that at or near the melting temperature of the polymer composition so that it remains in a fluidic state. For example, the molding temperature may range from about 290° C. to about 450° C., in some embodiments from about 310° C. to about 420° C., and in some embodiments, from about 320° C. to about 360° C.

The polymer composition may be supplied to the resin flow path using a variety of techniques. In FIG. 1, a flowable polymer composition 57 is gravity cast into the mold cavity 16 by pouring it from a container 54 or other similar device. In this manner the flowable composition fills the mold cavity at a relatively low shear rate, which as indicated above, minimizes the degree to which the polymer composition undergoes shear orientation, which can thus result in a part having isotropic properties. If desired, casting may be performed in a vacuum chamber and/or pressurized container to minimize the formation of air bubbles in the part. In addition to gravity casting, other techniques may also be employed in which pressure and/or centrifugal forces are employed to help force the flowable composition into the mold cavity. For example, the composition may be supplied via an extruder that forces the composition into the cavity at a low shear rate. Once cast, the composition is allowed to cool so that a part is formed having a predetermined shape. If desired, a cooling mechanism may be provided to help solidify the polymer composition within the mold cavity. For instance, the mold bases 12 and 14 may include one or more cooling lines (not shown) through which a cooling medium (e.g., water) may flow to impart the desired mold temperature to the surface of the mold bases for solidifying the molten material. The composition may also be allowed to cool under ambient conditions. Other processing steps may also be employed as is known in the art. For example, the molded part may be pressed into a densified billet to reduce the number of pores. Suitable pressing techniques may include, for instance, hot isostatic pressing, uniaxial hot pressing, cold isostatic pressing, etc.

Regardless of the cast molding technique employed, it has been discovered that the polymer composition of the present invention, which possesses the unique combination of high flowability and good mechanical properties, is particularly well suited for "stock shapes" having a predetermined shape and size. Such parts may possess a wide variety of cross-sectional shapes, such as square, rectangular, circular, elliptical, triangular, I-shaped, C-shaped, U-shaped, J-shaped, L-shaped, etc. Although not necessarily required, the part may be a "lineal" part to the extent that its cross-sectional shape is substantially the same along the entire length of the part. The total cross-sectional thickness or height typically ranges from about of from about 0.1 to about 50 millimeters, in some embodiments from about 0.5 to about 40 millimeters, and in some embodiments, from about 1 to about 20 millimeters.

If desired, the part may also be applied with a capping layer to enhance the aesthetic appeal and/or protect it from environmental conditions, or to impact wear resistance. The capping layer may contain any suitable thermoplastic polymer known in the art that is generally compatible with the liquid crystalline polymer composition used to form the part. Suitable capping polymers may include, for instance, polyolefins (e.g., polypropylene, propylene-ethylene copolymers, etc.), polyesters (e.g., polybutylene terephalate ("PBT")), polycarbonates, polyamides (e.g., Nylon™), polyether ketones (e.g., polyetherether ketone ("PEEK")), polyetherimides, polyarylene ketones (e.g., polyphenylene diketone ("PPDK")), liquid crystal polymers, polyarylene sulfides (e.g., polyphenylene sulfide ("PPS"), poly(biphenylene sulfide ketone), poly(phenylene sulfide diketone), poly(biphenylene sulfide), etc.), fluoropolymers (e.g., polytetrafluoroethylene-perfluoromethylvinylether polymer, perfluoro-alkoxyalkane polymer, petrafluoroethylene polymer, ethylene-tetrafluoroethylene polymer, etc.), polyacetals, polyurethanes, polycarbonates, styrenic polymers (e.g., acrylonitrile butadiene styrene ("ABS")), acrylic polymers, polyvinyl chloride (PVC), etc. The capping layer may also contain other additives for improving the final properties of the part. For instance, it may be desirable to add pigments to reduce finishing labor, or it may be desirable to add flame retardant agents to enhance the flame retarding features of the part. Other additive materials may include, for instance, mineral reinforcing agents, lubricants, flame retardants, blowing agents, foaming agents, ultraviolet light resistant agents, thermal stabilizers, pigments, and combinations thereof. Suitable mineral reinforcing agents may include, for instance, calcium carbonate, silica, mica, clays, talc, calcium silicate, graphite, calcium silicate, alumina trihydrate, barium ferrite, and combinations thereof.

Figure 2:
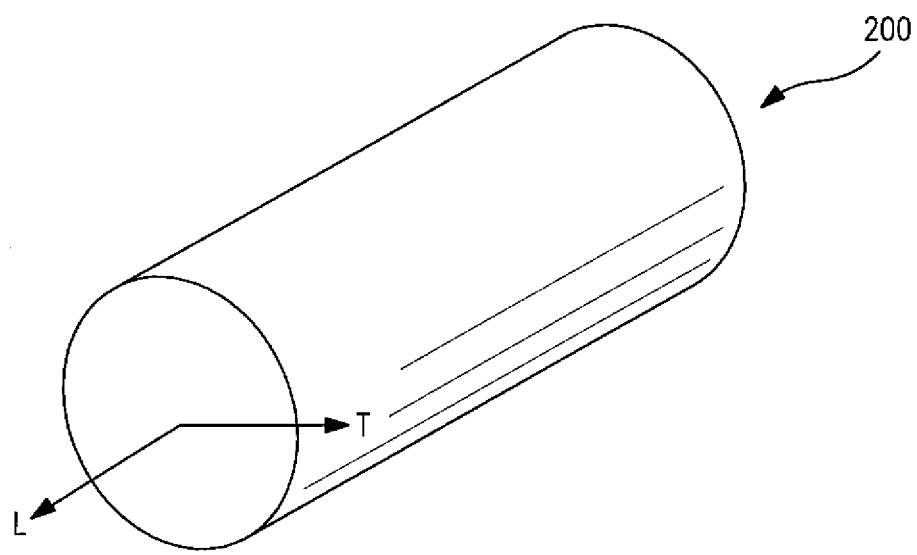
FIG. 2 is a perspective view of one embodiment of a rod that may be formed according to the present invention.
Figure 3:
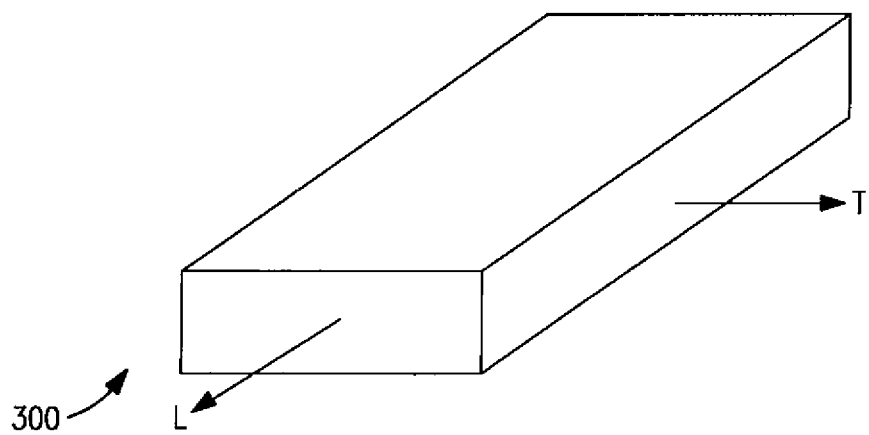
FIG. 3 is an exploded perspective view of one embodiment of a substantially rectangular stock shape that may be formed according to the present invention.

The parts may be subsequently machined or otherwise formed into consumable goods, or parts for a consumable good. Exemplary parts that may be formed in accordance with the present invention include, but are not limited to rods, tubes, plates, bars, sheets, etc. Referring to FIG. 2, for example, one particular embodiment of a cylindrical rod 200 is shown that may be formed in accordance with the present invention. The rod 200 has a lengthwise dimension defined in a longitudinal direction L and a transverse dimension defined in a transverse direction T. FIG. 3 likewise illustrates another embodiment of a substantially rectangular stock shape 300, which may also be formed in accordance with the present invention. Although not required, both of the parts illustrated in FIGS. 2 and 3 are lineal in that their cross-sectional dimension is substantially constant along the longitudinal direction L.

Regardless of the particular size and shape of the part, the ability to cast the polymer composition at a relatively low shear rate can inhibit shear-induced molecular alignment, which can translate into a part having substantially isotropic mechanical properties. As used herein, the term "substantially isotropic" means that at least one mechanical property (i.e., tensile strength, tensile break strain, or tensile modulus) of the part is substantially the same in the lengthwise dimension as in the transverse dimension. More particularly, the value of a mechanical property in the lengthwise dimension divided by the value of the same property in the transverse direction is typically within a range of from about 0.6 to about 1.4, in some embodiments from about 0.7 to about 1.3, and in some embodiments, from about 0.8 to about 1.2. The cast molded part may, for example, exhibit a tensile strength in the longitudinal direction and/or the transverse direction of from about 20 to about 500 MPa, in some embodiments from about 50 to about 400 MPa, and in some embodiments, from about 100 to about 350 MPa; a tensile break strain of about 0.5% or more, in some embodiments from about 0.6% to about 10%, and in some embodiments, from about 0.8% to about 3.5%; and/or a tensile modulus of from about 5,000 MPa to about 20,000 MPa, in some embodiments from about 8,000 MPa to about 20,000 MPa, and in some embodiments, from about 10,000 MPa to about 15,000 MPa. The tensile properties may be determined in accordance with ISO Test No. 527 (technically equivalent to ASTM D638) at 23° C. The cast molded part may also exhibit a flexural strength in the transverse and/or longitudinal direction of from about 20 to about 500 MPa, in some embodiments from about 50 to about 400 MPa, and in some embodiments, from about 100 to about 350 MPa; a flexural break strain of about 0.5% or more, in some embodiments from about 0.6% to about 10%, and in some embodiments, from about 0.8% to about 3.5%; and/or a flexural modulus of from about 5,000 MPa to about 20,000 MPa, in some embodiments from about 8,000 MPa to about 20,000 MPa, and in some embodiments, from about 10,000 MPa to about 15,000 MPa. The flexural properties may be determined in accordance with ISO Test No. 178 (technically equivalent to ASTM D790) at 23° C.

The present invention may be better understood with reference to the following examples.

Test Methods

Melt Viscosity:
The melt viscosity (Pa-s) may be determined in accordance with ISO Test No. 11443 at 350° C. and at a shear rate of 1000 $s^{-1}$ using a Dynisco LCR7001 capillary rheometer. The rheometer orifice (die) may have a diameter of 1 mm, length of 20 mm, L/D ratio of 20.1, and an entrance angle of 180°. The diameter of the barrel was 9.55 mm±0.005 mm and the length of the rod may be 233.4 mm.

Melting Temperature:

The melting temperature ("Tm") may be determined by differential scanning calorimetry ("DSC") as is known in the art. The melting temperature is the differential scanning calorimetry (DSC) peak melt temperature as determined by ISO Test No. 11357. Under the DSC procedure, samples may be heated and cooled at 20° C. per minute as stated in ISO Standard 10350 using DSC measurements conducted on a TA Q2000 Instrument.

Tensile Modulus, Tensile Stress, and Tensile Elongation:

Tensile properties may be tested according to ISO Test No. 527 (technically equivalent to ASTM D638). Modulus and strength measurements may be made on the same test strip sample having a length of 80 mm, thickness of 10 mm, and width of 4 mm. The testing temperature may be 23° C., and the testing speeds may be 1 or 5 mm/min.

Flexural Modulus, Flexural Stress, and Flexural Strain:

Flexural properties may be tested according to ISO Test No. 178 (technically equivalent to ASTM D790). This test may be performed on a 64 mm support span. Tests may be run on the center portions of uncut ISO 3167 multi-purpose bars. The testing temperature may be 23° C. and the testing speed may be 2 mm/min.

Notched Charpy Impact Strength:

Notched Charpy properties may be tested according to ISO Test No. ISO 179-1) (technically equivalent to ASTM D256, Method B). This test may be run using a Type A notch (0.25 mm base radius) and Type 1 specimen size (length of 80 mm, width of 10 mm, and thickness of 4 mm). Specimens may be cut from the center of a multi-purpose bar using a single tooth milling machine. The testing temperature may be 23° C.

Coefficient of Linear Thermal Expansion:

The CLTE measurements were obtained by using TA instruments Thermo-mechanical Analyzer (TMA) model 2940 standard expansion probe, MCA cooling system. The testing conditions were as follows—Ramp 10° C./min to 180° C., Isothermal 1 minute, Ramp 5° C./min, isothermal 2 minutes, Ramp to 260° C. @ 5° C./min. The thermal expansion coefficient was measured in duplicate using a fresh specimen each time, in both along-the-flow and across-the-flow directions (duplicate, Ref: ISO 11359-2). The average linear thermal expansion coefficients (CLTE) were determined using the least square fit method (from 20° C. to 80° C.).

Synthesis of N1,N4-diphenylterephthalamide

Compound A

The synthesis of Compound A from terephthaloyl chloride and aniline may be performed according to the following scheme:

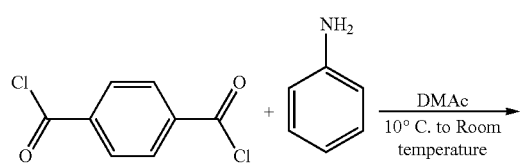

-continued

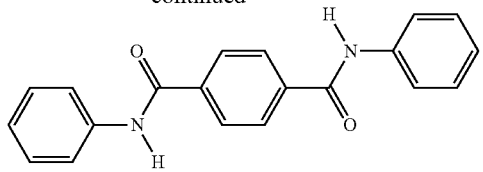

The experimental set up may consist of a 2 L glass beaker equipped with a glass rod stirrer coupled with an overhead mechanical stirrer. Dimethyl acetamide ("DMAc") (3 L) may be added to the beaker and the beaker may be immersed in an ice bath to cool the system to 10-15° C. Then aniline (481.6 g) may be added to the solvent with constant stirring, the resultant mixture was cooled to 10-15° C. Terephthaloyl chloride (300 g) may be added gradually to the cooled stirred mixture such that the temperature of the reaction is maintained below 30° C. The acid chloride may be added over a period of one-two hours, after which the mixture may be stirred for another three hours at 10-15° C. and then at room temperature overnight. The reaction mixture may be milky white (a fine suspension of the product in the solvent) and vacuum filtered using a filter paper and a Buchner funnel. The crude product may be washed with acetone (2 L) and then washed with hot water (2 L). The product may then be air dried over night at room temperature and dried in a vacuum oven 150° C. for 4-6 hours. The product (464.2 g) may be a highly crystalline white solid. The melting point may be 346-348° C., as determined by differential scanning calorimetry ("DSC").

Synthesis of N1,N4-diphenylisoterephthanalide

Compound B

The synthesis of Compound B from isophthaloyl chloride and aniline may be performed according to the following scheme:

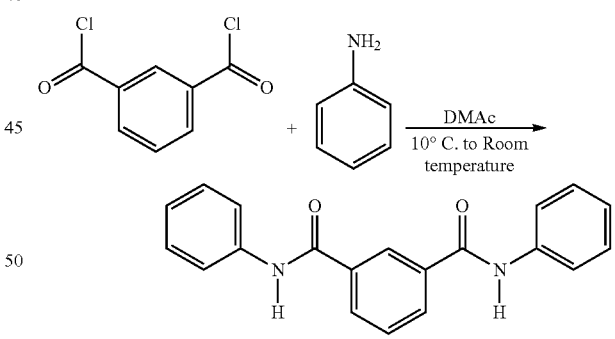

The experimental set up may consist of a 2 L glass beaker equipped with a glass rod stirrer coupled with an overhead mechanical stirrer. DMAc (1.5 L) may be added to the beaker and immersed in an ice bath to cool the solvent to 10-15° C. Then aniline (561.9 g) may be added to the solvent with constant stirring, the resultant mixture may be cooled to 10-15° C. Isophthaloyl chloride (350 g dissolved in 200 g of DMAc) may be added gradually to the cooled stirred mixture such that the temperature of the reaction was maintained below 30° C. The acid chloride was added over a period of one hour, after which the mixture was stirred for another three hours at 10-15° C. and then at room temperature overnight. The reaction mixture was milky white in appearance. The product was recovered by precipitation by addition of 1.5 L of distilled water and followed by was vacuum filtration using a filter paper and a Buchner funnel. The crude product was then washed with acetone (2 L) and then washed again with hot water (2 L). The product was then air dried over night at room temperature and then was dried in a vacuum oven 150° C. for 4-6 hours. The product (522 g) was a white solid. The melting point was 290° C. as determined by DSC.

Synthesis of 1,3-Benzenedicarboxamide, N1,N3-dicyclohexyl

Compound O1

The synthesis of Compound O1 from isophthaloyl chloride and cyclohexyl amine can be performed according to the following scheme:

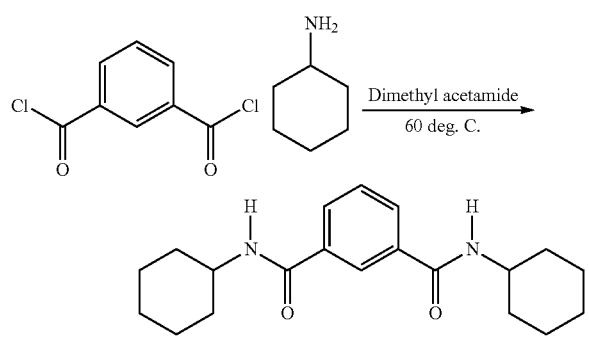

The experimental set up consisted of a 1 L glass beaker equipped with a glass rod stirrer coupled with an overhead mechanical stirrer. Cyclohexyl amine (306 g) was mixed in dimethyl acetamide (1 L) (alternatively N-methylpyrrolidone can also be used) and triethyl amine (250 g) at room temperature. Next isopthaloyl chloride (250 g) was slowly added over a period of 1.5 to 2 hours, to the amine solution with constant stirring. The rate of addition of the acid chloride was maintained such that the reaction temperature was maintained less than 60° C. After complete addition of the benzoyl chloride, the reaction mixture was gradually warmed to 85-90° C. and then allowed to cool to around 45-50° C. The mixture was allowed to rest overnight (for at least 3 hours) at room temperature. The product was recovered by precipitation through the addition of 1.5 L of distilled water, which was followed by was vacuum filtration using a filter paper and a Buchner funnel. The crude product was then washed with acetone (250 mL) and washed again with hot water (500 mL). The product (yield: ca. 90%) was then air dried over night at room temperature and then was dried in a vacuum oven 150° C. for 4 to 6 hours. The product was a white solid. The Proton NMR characterization was as follows: $^1$H NMR (400 MHz d$_6$-DMSO): 8.3 (s, 2H, CONH), 8.22 (s, 1H, Ar), 7.9 (d, 2H, Ar), 7.5 (s, 1H, Ar), 3.7 (broad s, 2H, cyclohexyl), 1.95-1.74 broad s, 4H, cyclohexyl) and 1.34-1.14 (m, 6H, cyclohexyl).

Example 1

A 2-liter flask is initially charged with HBA (518.8 g), HNA (56.5 g), TA (161.5 g), BP (125.1 g), APAP (45.3 g), potassium acetate (39 mg), and Compound A (47.12 g). The flask is equipped with C-shaped stirrer, a thermal couple, a gas inlet, and distillation head. The flask is placed under a low nitrogen purge and acetic anhydride (99.7% assay, 601.8 g) is added. The milky-white slurry is agitated at 75 rpm and heated to 140° C. over the course of 95 minutes using a fluidized sand bath. After this time, the mixture is then gradually heated to 350° C. steadily over 290 minutes. Reflux is seen once the reaction exceeds 140° C. and the overhead temperature increases to approximately 115° C. as acetic acid byproduct is removed from the system. During the heating, the mixture grows yellow and slightly more viscous and the vapor temperature gradually drops to 90° C. Once the mixture has reached 350° C., the nitrogen flow is stopped. The flask is evacuated below 20 psi and the agitation slows to 30 rpm over the course of 45 minutes. As the time under vacuum progresses, the mixture grows viscous. After 69 minutes, in the final vacuum step, no torque is recorded as seen by the strain on the agitator motor. The reaction is then stopped by releasing the vacuum and stopping the heat flow to the reactor.

Once formed, the resin is then dried at 120° C. and powder coated with an additional 2 wt % of Compound A to further reduce the melt viscosity. The mixture is then melt mixed using a Leistritz 18 mm co-rotating fully intermeshing twin screw extruder having 6 temperature control zones (including at the extrusion die) and has an overall L/D of 30. A general purpose screw design is used to compound the additives into a resin matrix. All materials are fed to the feed throat in the first barrel by means of a volumetric feeder. Materials are melted and mixed then extruded through a single hole strand die. The composition is compounded at a rate of 11 lb/hr, barrel temperature of 340° C., and screw speed of 300 rpm. The resulting material is directly poured from the die into a heated rod stock shape mold. The mold is heated to 340° C. Pouring continues until approximately 750 grams are poured into the mold. The mold is heated for an additional 15 minutes and then allowed to cool to room temperature. The stock shape is then isolated and machined to form a sample that is tested for the coefficient of linear thermal expansion, which was determined as the ratio of the coefficient of linear expansion in the 'along-the-flow' direction (27.45) and the coefficient of linear expansion in the 'across-the-flow' direction (97.99) for a value of 0.28.

Example 2

A polymer was synthesized in the manner described in Example 1, except that Compound B (47.12 g) was used as a flow modifier. Once formed, the resin is poured into a heated rod stock shape mold maintained at 340° C. The mold is then allowed to cool overnight to room temperature. The stock shape is then isolated and machined to form a sample that could be tested for the CLTE (CLTE=Coefficient of linear thermal expansion). CLTE for the this part was found to be—CLTE (along-the-flow)/CLTE (across-the-flow)=4.17/87.93=0.047.

It is to be noted that the specimens analyzed for CLTE value are more isotropic in nature than the control sample which did not have any flow modifier and was extruded and injection molded. CLTE (along)/CLTE (across)=−5.55/67.39=−0.082.

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A molded part that is formed by casting a polymer composition into a mold cavity, wherein the polymer composition comprises a thermotropic liquid crystalline polymer and an aromatic amide oligomer, and wherein the polymer composition of the molded part has a melt viscosity of from about 0.1 to about 80 Pa-s, as determined at a shear rate of 1000 seconds$^{-1}$ and temperature of 350° C. in accordance with ISO Test No. 11443.

2. The molded part of claim 1, wherein the liquid crystalline polymer is wholly aromatic.

3. The molded part of claim 1, wherein the liquid crystalline polymer contains monomer repeat units derived from one or more aromatic hydroxycarboxylic acids, aromatic dicarboxylic acids, aromatic dials, aromatic amines, aromatic diamines, or a combination of the foregoing.

4. The molded part of claim 3, wherein the liquid crystalline polymer contains monomer repeat units derived from 4-hydroxybenzoic acid, 6-hydroxy-2-naphthoic acid, terephthalic acid, isophthalic acid, 4,4'-biphenol, hydroquinone, acetaminophen, or a combination of the foregoing.

5. The molded part of claim 1, wherein the aromatic amide oligomer is employed in an amount of from about 0.1 to about 10 parts by weight relative to 100 parts by weight of the liquid crystalline polymer.

6. The molded part of claim 1, wherein the aromatic amide oligomer has a molecular weight of 3,000 grams per mole or less.

7. The molded part of claim 1, wherein the oligomer has from 2 to 8 amide bonds per molecule.

8. The molded part of claim 1, wherein the aromatic amide oligomer has the following general formula (I):

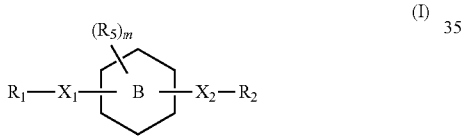

(I)

wherein,
ring B is a 6-membered aromatic ring wherein 1 to 3 ring carbon atoms are optionally replaced by nitrogen or oxygen, wherein each nitrogen is optionally oxidized, and wherein ring B may be optionally fused or linked to a 5- or 6-membered aryl, heteroaryl, cycloalkyl, or heterocyclyl;

$R_5$ is halo, haloalkyl, alkyl, alkenyl, aryl, heteroaryl, cycloalkyl, or heterocyclyl;
m is from 0 to 4;
$X_1$ and $X_2$ are independently C(O)HN or NHC(O); and
$R_1$ and $R_2$ are independently selected from aryl, heteroaryl, cycloalkyl, and heterocyclyl.

9. The molded part of claim 8, wherein ring B is phenyl, $R_1$ is phenyl or cyclohexyl, and $R_2$ is phenyl or cyclohexyl.

10. The molded part of claim 1, wherein the aromatic amide oligomer has the following general formula (IV):

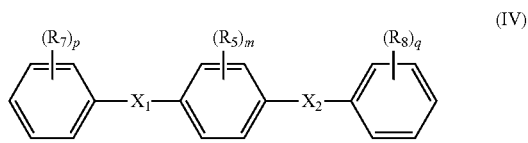

(IV)

wherein,
$X_1$ and $X_2$ are independently C(O)HN or NHC(O);
$R_5$, $R_7$, and $R_8$ are independently selected from halo, haloalkyl, alkyl, alkenyl, aryl, heteroaryl, cycloalkyl, and heterocyclyl;
m is from 0 to 4; and
p and q are independently from 0 to 5.

11. The molded part of claim 1, wherein the aromatic amide oligomer has the following general formula (V):

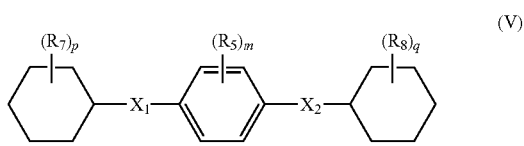

(V)

wherein,
$X_1$ and $X_2$ are independently C(O)HN or NHC(O);
$R_5$, $R_7$, and $R_8$ are independently selected from halo, haloalkyl, alkyl, alkenyl, aryl, heteroaryl, cycloalkyl, and heterocyclyl;
m is from 0 to 4; and
p and q are independently from 0 to 5.

12. The molded part of claim 1, wherein the aromatic amide oligomer is selected from the group consisting of the following compounds:

| Structure | Name |
|---|---|
| | N1,N4-diphenylterephthalamide |
| | N1,N4-diphenylisoterephthalamide |

| Structure | Name |
|---|---|
| | N1,N4-bis(2,3,4,5,6-pentafluorophenyl)terephthalamide |
| | N1,N4-bis(4-benzamidophenyl)terephthalamide |
| | N4-phenyl-N1-[4-[[4-(phenylcarbamoyl)benzoyl]amino]phenyl]terephthalamide |
| | N4-phenyl-N1-[3-[[4-(phenylcarbamoyl)benzoyl]amino]phenyl]terephthalamide |
| | N1,N3-bis(4-benzamidophenyl)benzene-1,3-dicarboxamide |

-continued

| Structure | Name |
|---|---|
| | N3-phenyl-N1-[3-[[3-(phenylcarbamoyl)benzoyl]amino]phenyl]benzene-1,3-dicarboxamide |
| | N1,N3-bis(3-benzamidophenyl)benzene-1,3-dicarboxamide |
| | N1,N4-bis(4-pyridyl)terephthalamide |
| | N1,N3-bis(4-phenylphenyl)benzene-1,3-dicarboxamide |
| | N1,N3,N5-triphenylbenzene-1,3,5-tricarboxamide |

-continued

| Structure | Name |
|---|---|
| | N1,N3,N5-tris(4-benzamidophenyl)benzene-1,3,5-tricarboxamide |
| | N-(4,6-dibenzamido-1,3,5-triazin-2-yl)benzamide |
| | N2,N7-dicyclohexylnaphthalene-2,7-dicarboxamide |
| | N2,N6-dicyclohexylnaphthalene-2,6-dicarboxamide |

| Structure | Name |
|---|---|
| | N1,N3,N5-tris(3-benzamidophenyl)benzene-1,3,5-tricarboxamide |
| | 1,3-Benzenedicarboxamide, N1,N3-dicyclohexyl- |
| | 1,4-Benzenedicarboxamide, N1,N3-dicyclohexyl- |

13. The molded part of claim 1, wherein the aromatic amide oligomer is N1,N4-diphenylterephthalamide, N1,N4-diphenylisoterephthalamide, 1,3-benzenedicarboxamide, N1,N3-dicyclohexyl, or 1,4-benzenedicarboxamide, N1,N3-dicyclohexyl.

14. The molded part of claim 1, wherein the composition has a melt viscosity of from about 1 to about 40 Pa-s, as determined at a shear rate of 1000 seconds$^{-1}$ and temperature of 350° C. in accordance with ISO Test No. 11443.

15. The molded part of claim 1, wherein the part is a lineal part.

16. The molded part of claim 15, wherein the lineal part is a rod, tube, plate, bar, or sheet.

17. The molded part of claim 1, wherein the part has a cross-sectional thickness of from about 0.1 to about 50 millimeters.

18. The molded part of claim 1, wherein the part has a lengthwise dimension and a transverse dimension, wherein the part is substantially isotropic in the transverse and lengthwise dimensions.

19. A method for forming a molded part, the method comprising:
 casting a polymer composition into a mold cavity, wherein the polymer composition comprises a thermotropic liquid crystalline polymer and an aromatic amide oligomer; and
 allowing the cast polymer composition to cool within the mold cavity to form the molded part, wherein the cast polymer composition has a melt viscosity of from about 0.1 to about 80 Pa-s, as determined at a shear rate of 1000 seconds$^{-1}$ and temperature of 350° C. in accordance with ISO Test No. 11443.

20. The method of claim 19, wherein the polymer composition is cast at a shear rate of less than about 200 s$^{-1}$.

21. The method of claim 19, wherein the polymer composition is cast at a shear rate of from about 2 to about 50 s$^{-1}$.

22. The method of claim 19, wherein the polymer composition is gravity cast into the mold cavity.

23. The method of claim 22, wherein the polymer composition is poured into the mold cavity from a container.

24. The method of claim 19, wherein the molding temperature ranges from about 290° C. to about 450° C.

25. The method of claim 19, wherein the liquid crystalline polymer is wholly aromatic.

26. The method of claim 19, wherein the liquid crystalline polymer contains monomer repeat units derived from one or more aromatic hydroxycarboxylic acids, aromatic dicarboxylic acids, aromatic diols, aromatic amines, aromatic diamines, or a combination of the foregoing.

27. The method of claim 19, wherein the liquid crystalline polymer contains monomer repeat units derived from 4-hydroxybenzoic acid, 6-hydroxy-2-naphthoic acid, terephthalic acid, isophthalic acid, 4,4'-biphenol, hydroquinone, acetaminophen, or a combination of the foregoing.

28. The method of claim 19, wherein the liquid crystalline polymer is formed in the presence of the aromatic amide oligomer.

29. The method of claim 19, wherein the liquid crystalline polymer is melt blended with the aromatic amide oligomer after the polymer is formed.

30. The method of claim 19, wherein the aromatic amide oligomer has the following general formula (I):

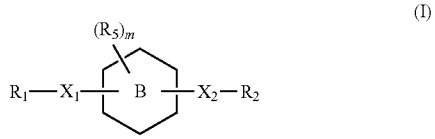

wherein, ring B is a 6-membered aromatic ring wherein 1 to 3 ring carbon atoms are optionally replaced by nitrogen or oxygen, wherein each nitrogen is optionally oxidized, and wherein ring B may be optionally fused or linked to a 5- or 6-membered aryl, heteroaryl, cycloalkyl, or heterocyclyl;

$R_5$ is halo, haloalkyl, alkyl, alkenyl, aryl, heteroaryl, cycloalkyl, or heterocyclyl;

m is from 0 to 4;

$X_1$ and $X_2$ are independently C(O)HN or NHC(O); and $R_1$ and $R_2$ are independently selected from aryl, heteroaryl, cycloalkyl, and heterocyclyl.

31. The method of claim 30, wherein ring B is phenyl, $R_1$ is phenyl or cyclohexyl, and $R_2$ is phenyl or cyclohexyl.

32. The method of claim 19, wherein the aromatic amide oligomer is selected from the group consisting of the following compounds:

| Structure | Name |
|---|---|
|  | N1, N4-diphenylterephthalamide |
|  | N1,N4-diphenylisoterephthalamide |
|  | N1,N4-bis(2,3,4,5,6-pentafluorophenyl)terephthalamide |
|  | N1,N4-bis(4-benzamidophenyl)terephthalamide |
|  | N4-phenyl-N1-[4-[[4-(phenylcarbamoyl)benzoyl]amino]phenyl]terephthalamide |

-continued

| Structure | Name |
|---|---|
| | N4-phenyl-N1-[3-[[4-(phenylcarbamoyl)benzoyl]amino]phenyl]terephthalamide |
| | N1,N3-bis(4-benzamidophenyl)benzene-1,3-dicarboxamide |
| | N3-phenyl-N1-[3-[[3-(phenylcarbamoyl)benzoyl]amino]phenyl]benzene-1,3-dicarboxamide |
| | N1,N3-bis(3-benzamidophenyl)benzene-1,3-dicarboxamide |

-continued

| Structure | Name |
|---|---|
| | N1,N4-bis(4-pyridyl)terephthalamide |
| | N1,N3-bis(4-phenylphenyl)benzene-1,3-dicarboxamide |
| | N1,N3,N5-triphenylbenzene-1,3,5-tricarboxamide |
| | N1,N3,N5-tris(4-benzamidophenyl)benzene-1,3,5-tricarboxamide |

-continued

| Structure | Name |
|---|---|
| | N-(4,6-dibenzamido-1,3,5-triazin-2-yl)benzamide |
| | N2,N7-dicyclohexylnaphthalene-2,7-dicarboxamide |
| | N2,N6-dicyclohexylnaphthalene-2,6-dicarboxamide |
| | N1,N3,N5-tris(3-benzamidophenyl)benzene-1,3,5-tricarboxamide |
| | 1,3-Benzenedicarboxamide, N1,N3-dicyclohexyl- |

-continued

| Structure | Name |
|---|---|
| (cyclohexyl-NH-C(O)-C6H4-C(O)-NH-cyclohexyl) | 1,4-Benzenedicarboxamide, N1,N3-dicyclohexyl- |

33. The method of claim 19, wherein the aromatic amide oligomer is N1,N4-diphenylterephthalamide, N1,N4-diphenylisoterephthalamide, 1,3-benzenedicarboxamide, N1,N3-dicyclohexyl, or 1,4-benzenedicarboxamide, N1,N3 dicyclohexyl.

34. The molded part of claim 1, wherein the polymer has a melting point.

35. The molded part of claim 34, wherein the melting point is from about 300° C. to about 400° C.

* * * * *